Jan. 13, 1959  D. F. RUTLAND ET AL  2,868,454
MULTIPLYING MECHANISM FOR ACCUMULATING PRODUCTS
AROUND A FIXED DECIMAL
Filed Sept. 1, 1953  11 Sheets-Sheet 3
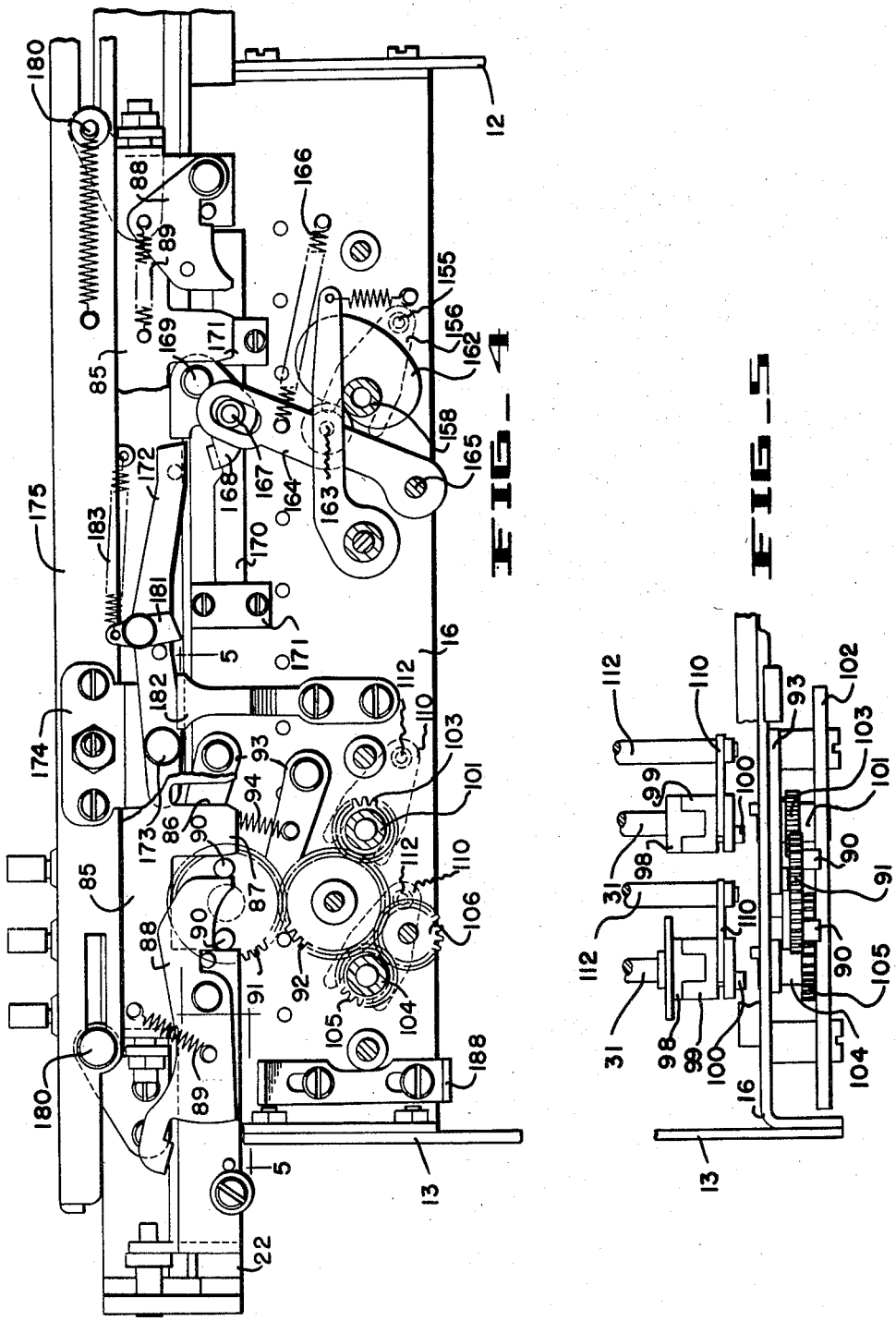
FIG_4
FIG_5

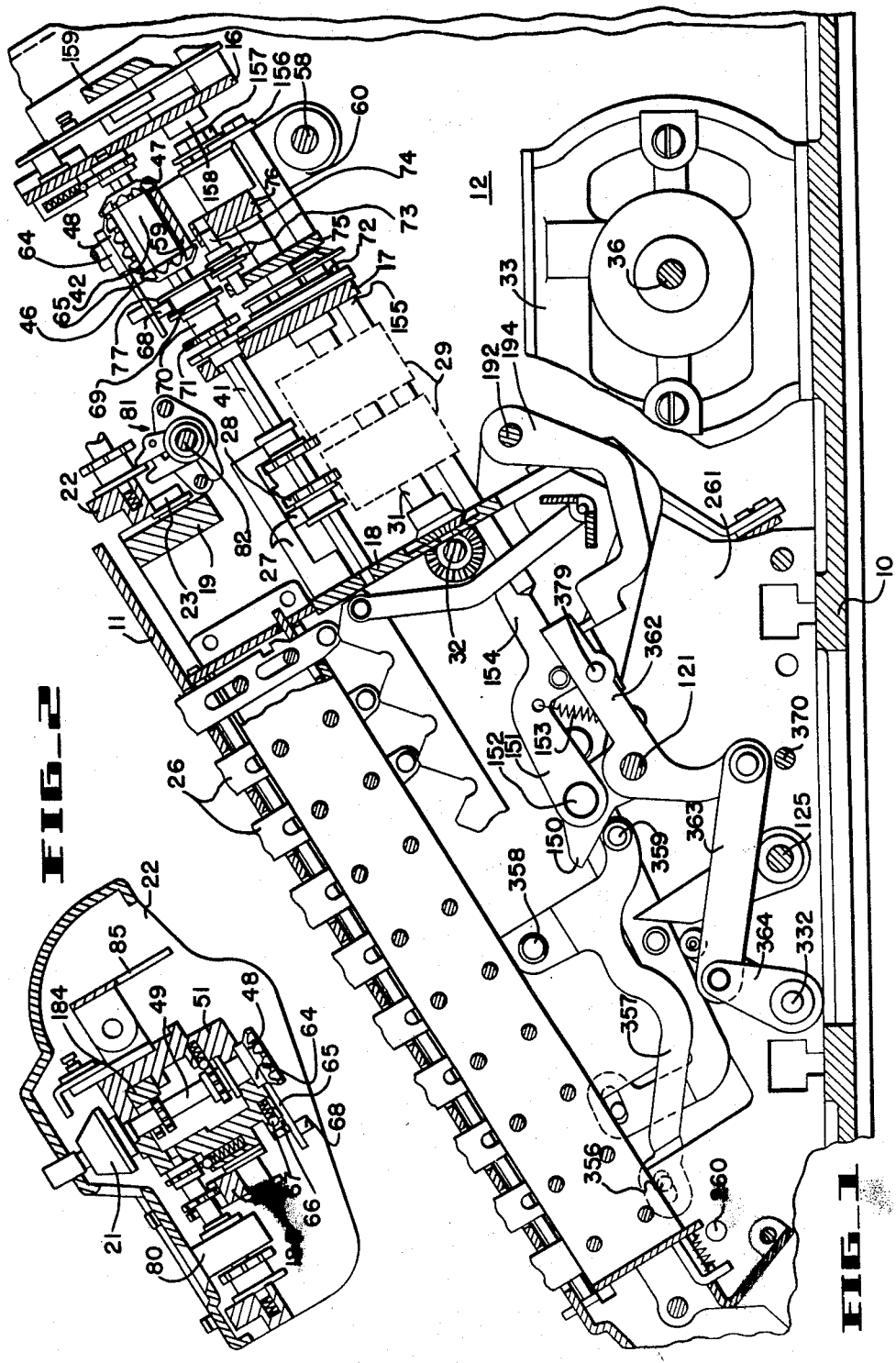

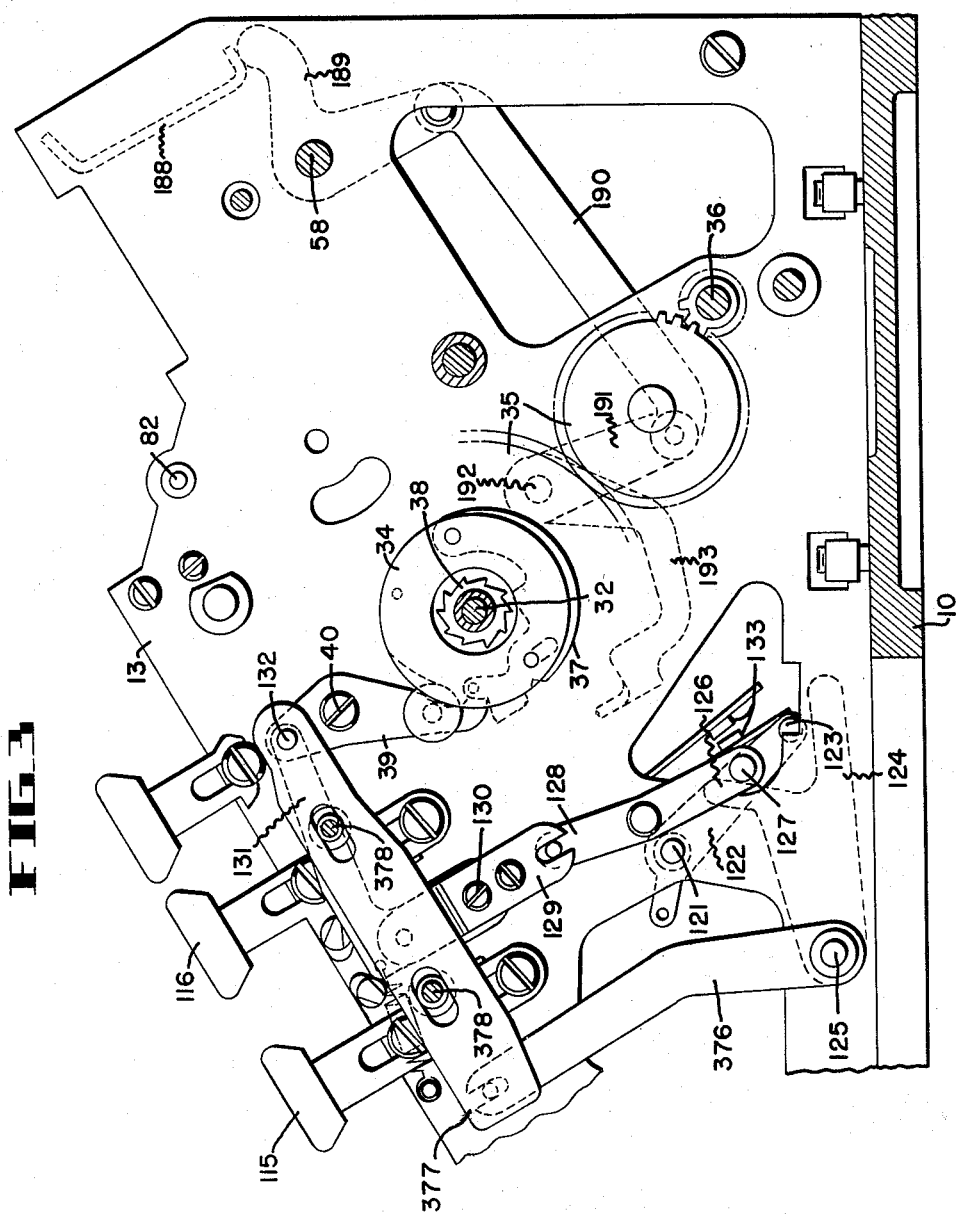

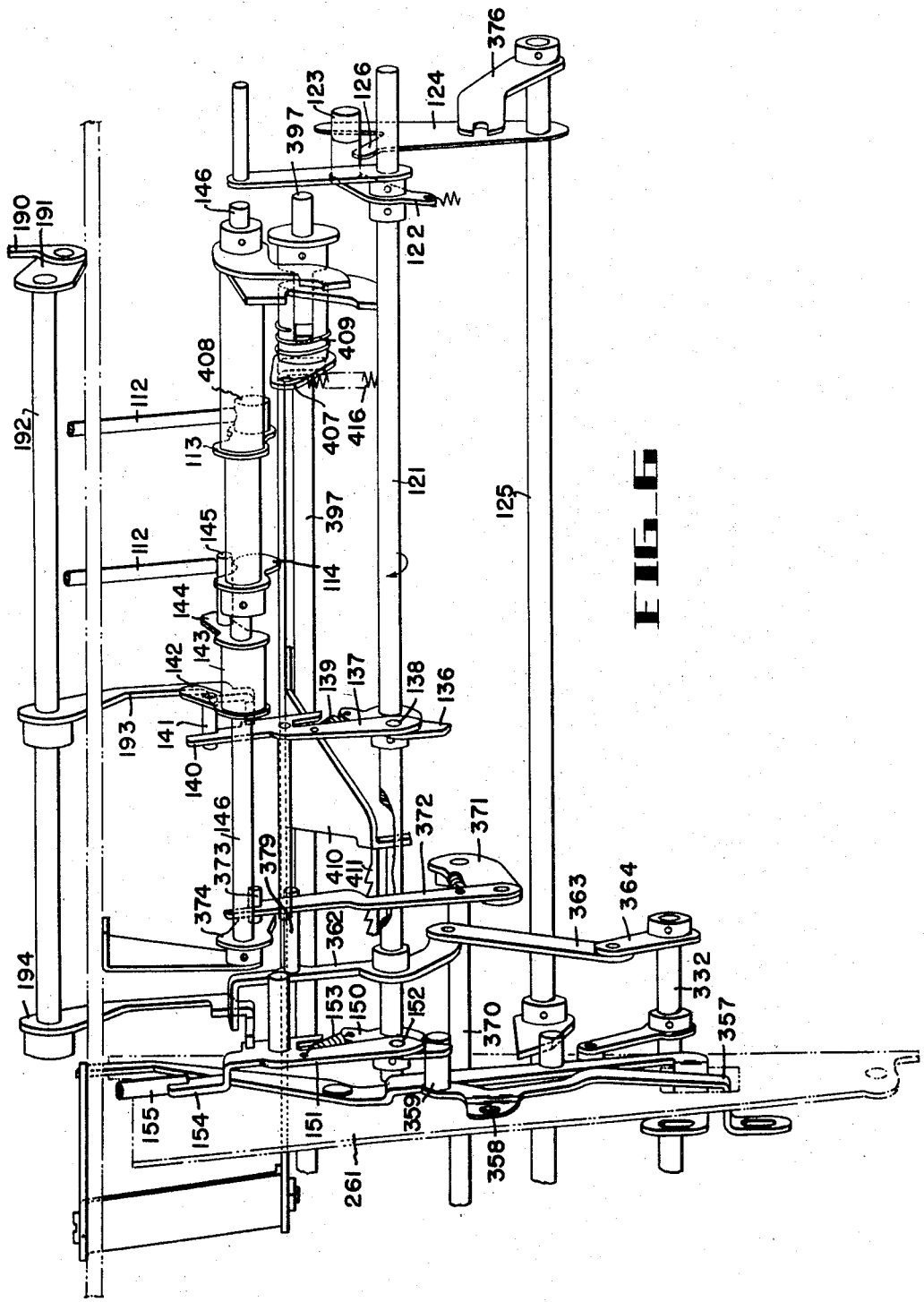

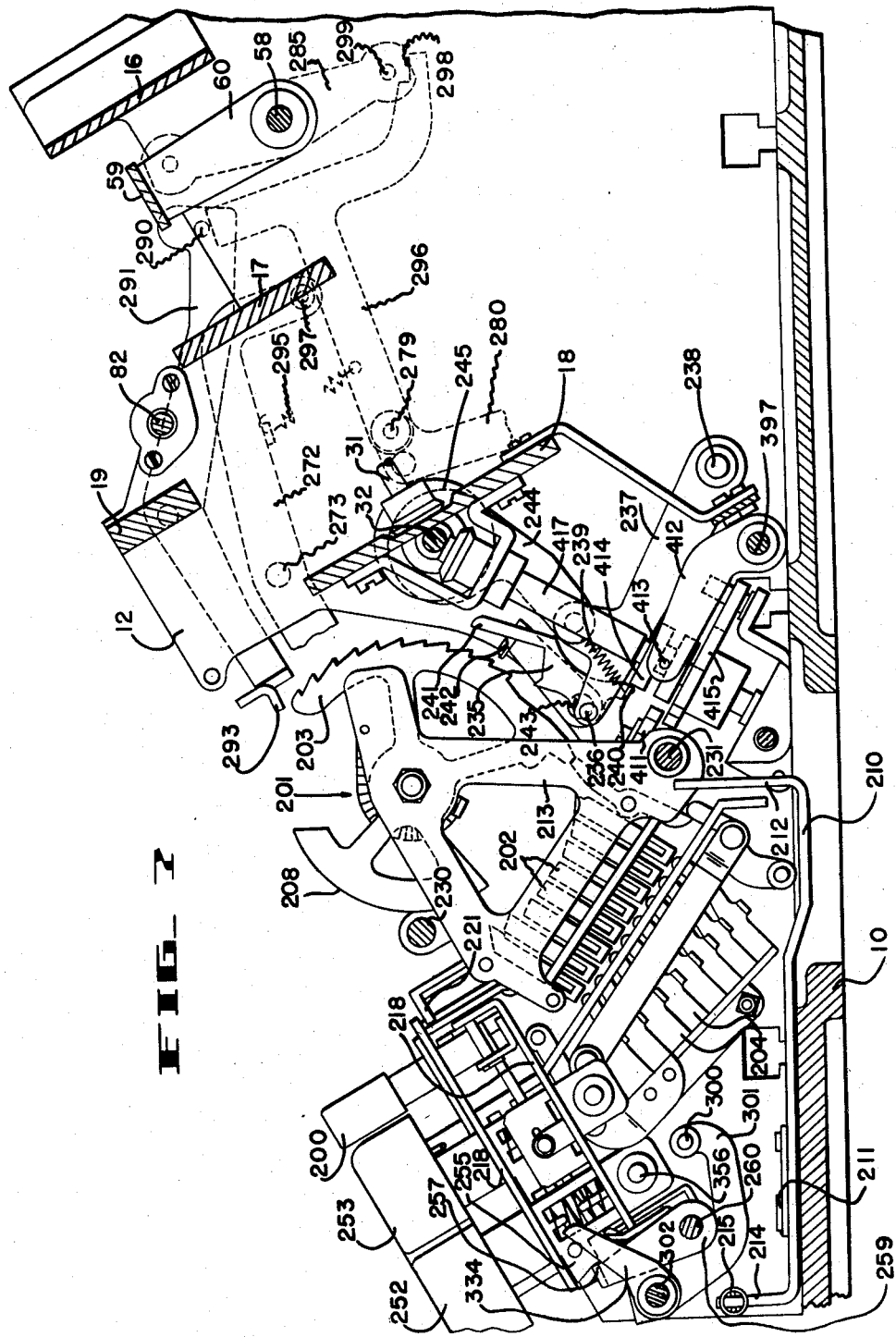

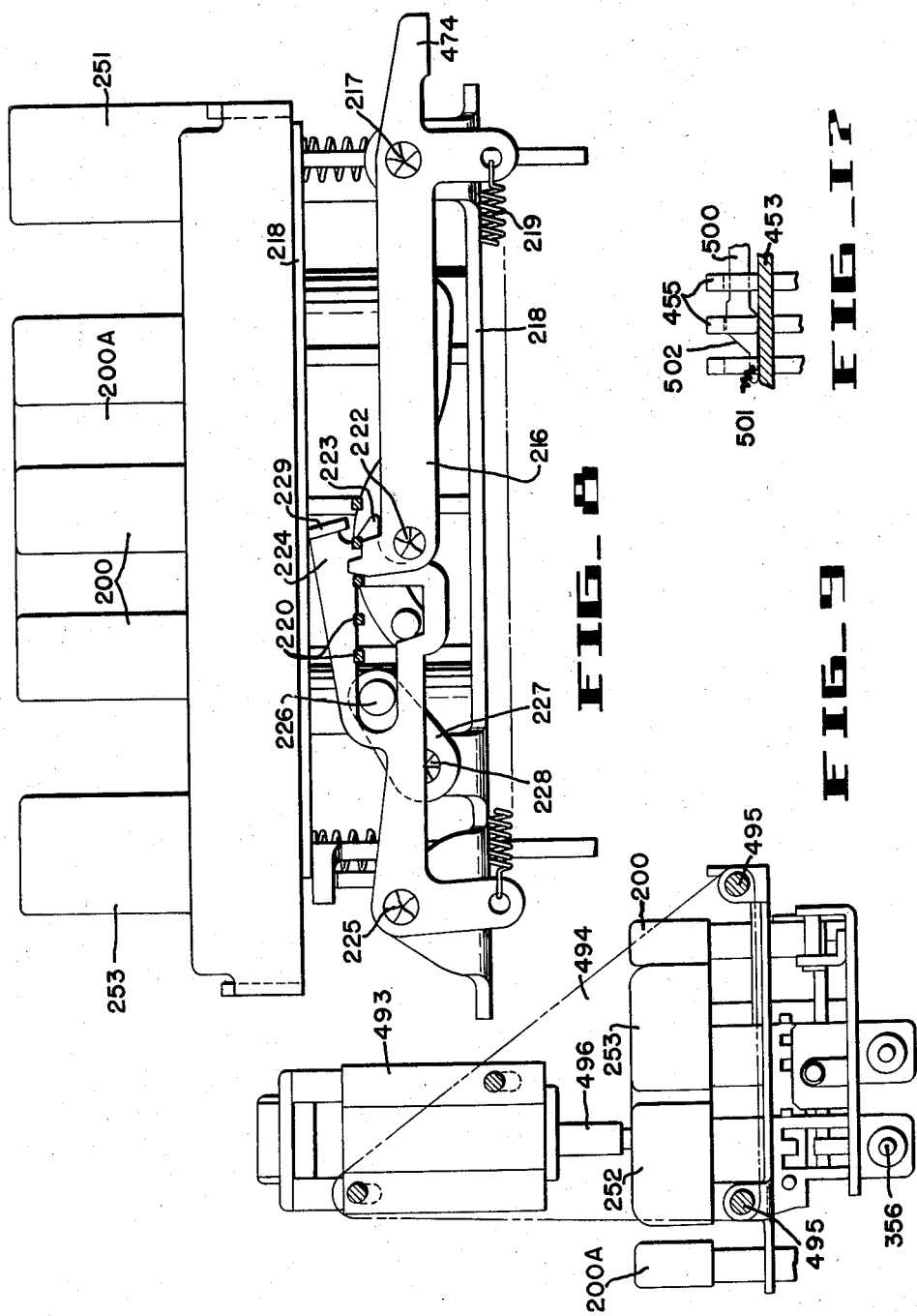

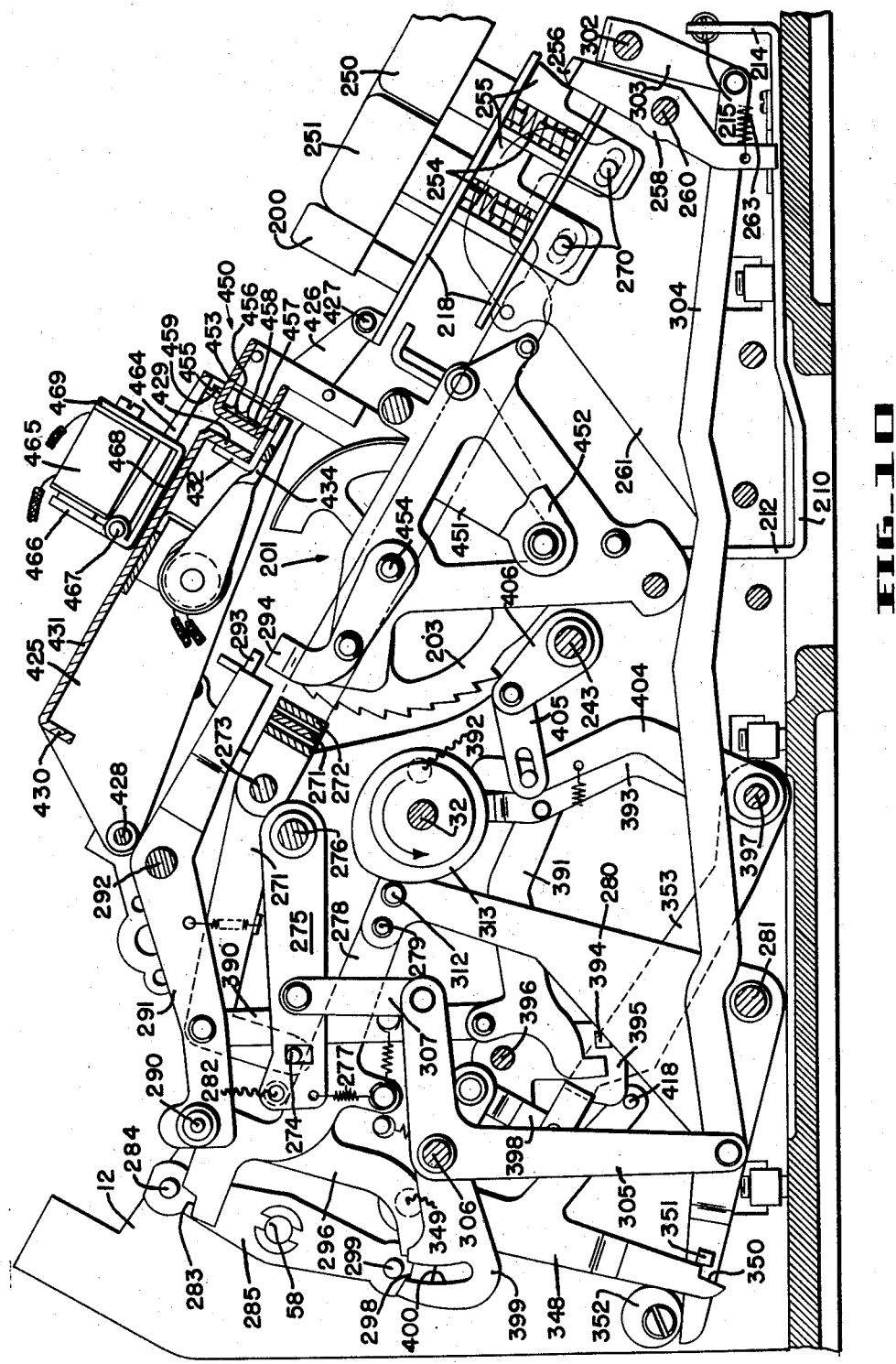

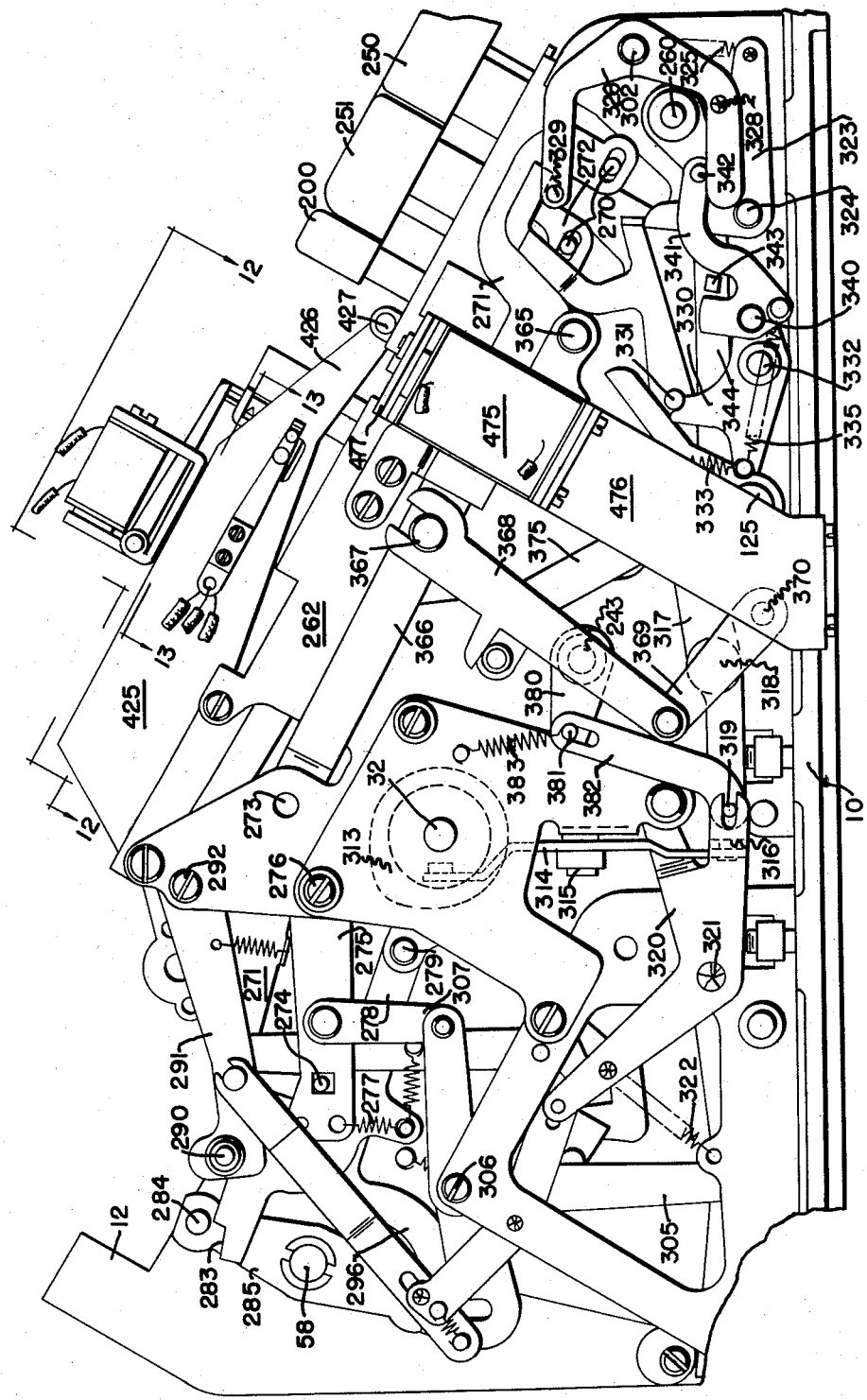
FIG_11

Jan. 13, 1959    D. F. RUTLAND ET AL    2,868,454
MULTIPLYING MECHANISM FOR ACCUMULATING PRODUCTS
AROUND A FIXED DECIMAL
Filed Sept. 1, 1953      11 Sheets-Sheet 9
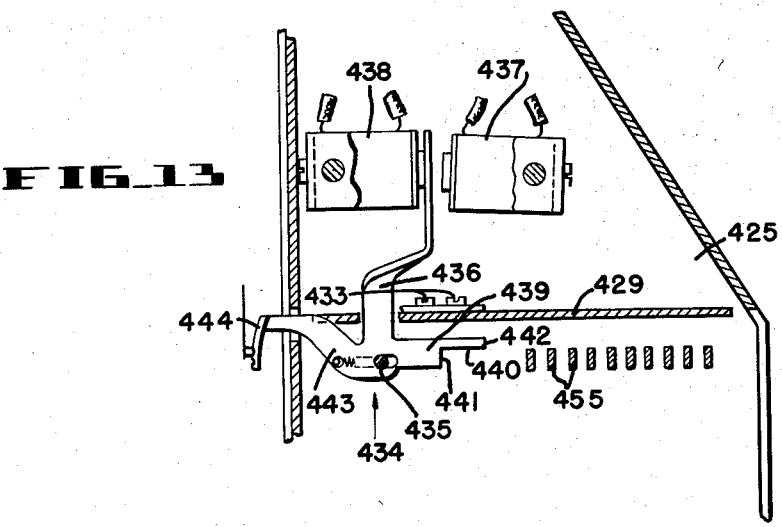
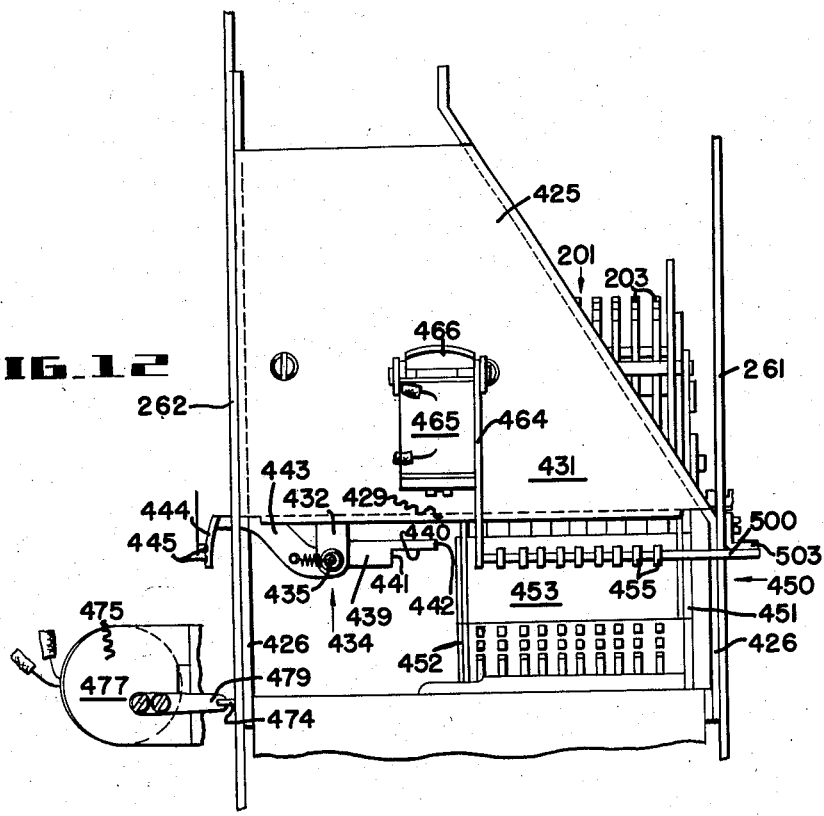

Jan. 13, 1959   D. F. RUTLAND ET AL   2,868,454
MULTIPLYING MECHANISM FOR ACCUMULATING PRODUCTS
AROUND A FIXED DECIMAL
Filed Sept. 1, 1953   11 Sheets-Sheet 10

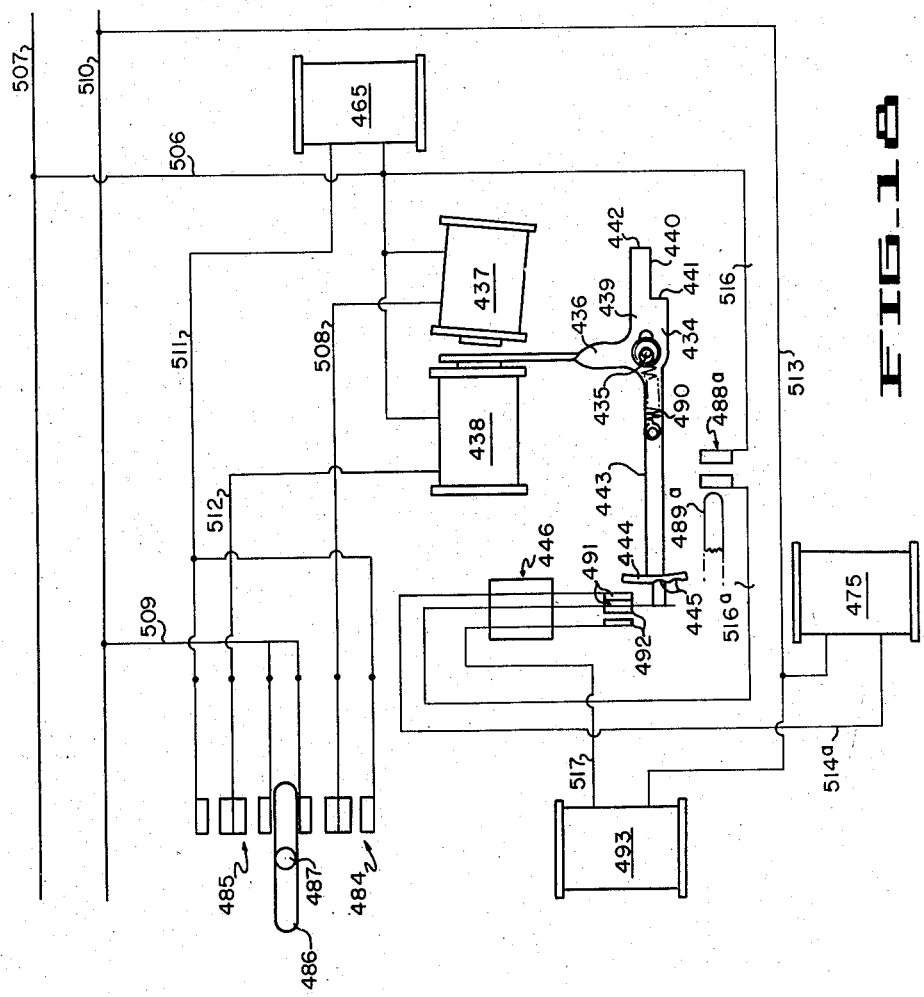

United States Patent Office 2,868,454
Patented Jan. 13, 1959

2,868,454

MULTIPLYING MECHANISM FOR ACCUMULATING PRODUCTS AROUND A FIXED DECIMAL

David F. Rutland, Sherman Oaks, and James C. Barclay, Malibu, Calif., assignors, by mesne assignments, to Friden, Inc., a corporation of California Application September 1, 1953, Serial No. 377,823

7 Claims. (Cl. 235—63)

This invention relates to calculating machines, and more particularly to the provision of improved mechanism for performing plural order multiplications in an automatic manner. The invention is especially useful in connection with the "Computyper" machine for the automatic control of a decimal insertion therein.

It is an object of the invention to provide an improved calculating machine in which plural order multiplying operations can be more efficiently controlled.

Another object of the invention is to provide an improved multiplication mechanism for simplifying certain computations such as quantity price, including discounts, tax, and the like.

Another object of the invention is to provide mechanism in a computing machine for automatically controlling the decimal insertion in a product.

Another object of the invention is to provide an improved computing machine in which the number of decimal places in a product is automatically determined.

Another object of the invention is to provide means for selective control of the number of decimal places in a plurality of products for accumulation in each of various tabulated positions of a register carrier.

A further object of the invention is to provide an improved calculating machine wherein the occurrence of a decimal point in a multiplier factor is inserted by the depression of a key during the setting-up of the factor to predetermine the number of decimal places in the product.

Another object of the invention is to provide a calculating machine with improved means for initiating a plural order operation under the control of the decimal insertion of a multiplier factor into the multiplier selection mechanism.

A further object of the invention is to provide an improved multiplying mechanism for a calculating machine in which the decimal position in a plurality of products to be registered, singly or accumulatively, may be predetermined automatically.

Other objects and advantages will be apparent from the following description of a preferred embodiment of the invention as illustrated in the accompanying drawings, in which:

Fig. 1 is a sectional elevation of the machine taken between two ordinal rows of numeral keys.

Fig. 2 is a sectional elevational view of the accumulator carriage.

Fig. 3 is a fragmentary elevational view of the right side frame showing the clutch control mechanism.

Fig. 4 is a elevational view of the carriage shifting and zero resetting mechanism taken from the rear of the machine.

Fig. 5 is a plan view of the right and left carriage shift clutches.

Fig. 6 is a perspective view of a part of the control linkage utilized in the shifting, resetting, and multiplying operations.

Fig. 7 is a sectional elevation of a portion of the multiplier mechanism.

Fig. 8 is a rear elevational view of the multiplier keyboard showing the escapement mechanism.

Fig. 9 is a detail of the right side of the multiplier keyboard showing the two right-hand control keys.

Fig. 10 is a sectional view of the multiplier controlled mechanism, the plane of the view being taken inside the left side frame.

Fig. 11 is a left side elevational view of the machine showing a portion of the multiplication control mechanism.

Fig. 12 is a plan view of the decimal control mechanism taken on the lines 12—12 of Fig. 11.

Fig. 13 is a sectional plan view of a portion of the decimal control mechanism taken on the line 13—13 of Fig. 11.

Fig. 17 is an enlarged detail of the pin resetting mechanism.

Fig. 18 is a wiring diagram of the decimal control electrical system similar to Fig. 14 with the exception of the control switch being in a circuit requiring closure thereof to initiate an operation.

Figure 15:
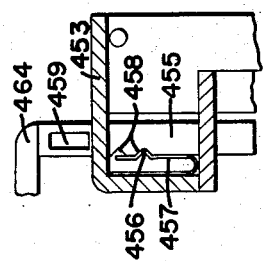
Fig. 15 is an enlarged detail of the pin rack assembly.

The invention is described in a preferred form as adapted to the "Computyper" machine incorporating the mechanism of Patent No. 2,371,752 issued to Carl M. Friden, March 20, 1945 and the improved mechanism of Patent No. 2,399,917 issued to Carl M. Friden et al., May 7, 1946. However, it is to be understood that the invention may have broader applications to calculating machines of other types under the automatic control of a typewriter.

In a calculating machine of the type to be hereinafter described, multiplication operations are more efficiently controlled upon the entry of the decimal portion of the multiplier factor into the multiplier selection mechanism. The multiplier factor may be entered into the selection mechanism by conventional manually controlled numeral keys or by solenoidally operated keys under the remote control of a typewriter or similar device. Likewise, upon the occurrence of a decimal point in the factor to be entered, the insertion thereof may be effected by a selective key or may be controlled automatically by the columnar tabulation of a typewriter carriage, one columnar position being effective to control the entry of a certain number of decimal places, while a second columnar position of the typewriter carriage is effective to predetermine a lesser or greater number of decimal places. As an example, in computing quantity price an invariable two-place decimal would be sufficient in the quantity price column of the ledger, while a four-place decimal would be desirable in the computation of discounts in the discount column of the ledger. A subsequent control of a multiply switch, either automatically or manually, determines the entry of the selected decimal insertion into the multiplier selection mechanism. Initiation of a multiplication operation, such as accumulative multiplication, is automatically effective upon the entry of the multiplier, including the decimal portion thereof, into the selection mechanism. Thus, with each multiplicand set in the keyboard of the machine relative to a preset decimal, the resulting products are accumulated in the register in correct decimal relation to the multiplicand.

*General description*

The machine includes base 10 (Fig. 1) which supports casing 11 (Fig. 1) and has side frame members 12, 13 mounted thereon. Side frame members 12, 13 (Figs. 1 and 3) are connected by various crossframe members 16, 17, 18 and 19 (Fig. 1) which serve to mount various mechanisms referred to hereinafter. The accumulator register comprises a series of reversible numeral wheels 21 (Fig. 2) in register carriage 22 mounted on crossframe members 16 and 19 by rollers 23 for endwise shifting movement laterally of the machine in either direction to various ordinal positions. The values to be introduced in the numeral wheels 21 are selected by means of a plurality of orders of settable value keys 26, one of which orders is illustrated in part in Fig. 1. Each order of keys 26 cooperates with selecting mechanism, including a pair of spring-urged slides 27 mounted for endwise movement to position the associated pair of gears 28 selectively with respect to the conventional stepped teeth on the associated actuating cylinder 29 shown in phantom in Fig. 1, each such slide being positioned in accordance with the value of the depressed key. Cylinders 29 (Fig. 1) are mounted on actuating shafts 31 having suitable bevel gear connections with transverse shaft 32 which is suitably journalled in side members 12, 13. Each shaft 31 serves for two orders of the machine and has a pair of similar cylinders 29 mounted thereon. Shaft 32 and shafts 31 are driven cyclically from motor 33 through a clutch 34 (Fig. 3) which is driven by suitable gearing 35 from motor shaft 36. Clutch 34 is engaged or disengaged in a well-known manner by oscillation of spring-urged clutch pawl, or dog, 37 mounted for rotation with shaft 32 with respect to ratchet 38 journalled on shaft 32 and driven by gearing 35. Clutch control lever 39 pivoted at 40 on side member 13, determines engagement or disengagemet of the clutch by releasing or engaging clutch dog 37 in the full-cycle position thereof.

From the above description it is seen that the values set in the machine by depression of keys 26 will be introduced into numeral wheels 21 by the cooperation of gears 28 with cylinders 29 during cyclic operation of the clutch. Each pair of gears 28 is slidably mounted on a square shaft 41 (Fig. 1) supported in cross members 17, 18 and extending rearwardly of the machine through cross-member 17 and having its rear end journalled in cross-member 16. Intermedite the members 16, 17, a spool 42 is slidably and non-rotatably mounted on each shaft 41 and has opposite bevel gears 46, 47 at its ends positioned for cooperation with numeral wheel gear 48 (Figs. 1 and 2) mounted at the lower end of numeral wheel shaft 49 journalled in frame 51 of carriage 22. Therefore, when one set of gears 46, 47 is engaged with gears 48, numeral wheels 21 will be rotated forwardly or reversely to register a number of increments equal to the value of the depressed key 26 in the aligned banks of keys.

*Plus and minus keys*

Means are provided for selectively determining positive or negative registration on the numeral wheels 21 in the form of a conventional plus key and minus key which are slidably mounted in the machine. The plus and minus keys are adapted to control positive and negative registrations in the accumulator and for this purpose they may be connected by suitable mechanism not disclosed herein to effect rocking of the shaft 58 (Fig. 1). A gate 59 extends transversely of the machine between plus-minus gears 46, 47 for the control thereof and is supported by two similar arms 60 secured on shaft 58 for rocking movement therewith. Thus, the depression of the plus key serves to rock shaft 58 (clockwise as seen in Fig. 1) to mesh gears 46 with numeral wheel gears 48, and the depression of the minus key serves to rock shaft 58 in the other direction (counter-clockwise in this figure), thereby meshing gears 47 with the numeral wheel shaft gears 48. The plus and minus keys also serve to engage the clutch and motor circuit by suitable means. This mechanism may be of the type disclosed in said Patent No. 2,371,752.

*Accumulator transfer mechanism*

Means are provided for carrying from one order to the next higher order in the accumulator register when the registration of a numeral wheel changes from "0" to "9" or vice versa. For this purpose each numeral wheel shaft 49 (Figs. 1 and 2) carries a single tooth gear 64 immediately beneath frame 51 in operative relation with transfer lever 65 pivoted at 66 on frame 51. Each lever 65 is mounted in frame 51 by a spring-pressed ball 67 engaging a suitable notch in pivot 66. Each lever 65 extends into the next higher order of the machine and carries a pin 68 which extends downwardly in opertaive relation with a flange 69 (Fig. 1) on collar 70. Gear 71 on collar 70 is normally disposed out of the path of the single tooth actuator 72 on shaft 31. When numeral wheel 21 of one order passes from "9" to "0" or vice versa, single tooth gear 64 rocks the associated lever 65 which, through pin 68, moves collar 70 to position gear 71 of the next higher order in the path of the associated transfer actuator 72. Thus, the transferred increment is introduced through either gear 46 or 47 of the next higher order, depending upon setting of the machine for addition or subtraction. Transfer gear 71 is maintained resiliently in either adjusted position thereof by the engagement of the flange 77 of collar 70 between spaced flanges 73 on stub shaft 74 slidably mounted in cross members 75, 76 and engaged by a suitable spring-pressed ball (not shown). A suitable conventional restoring means is provided for the shiftable transfer mechanism in association with transfer actuator 72.

*Revolutions counter*

A revolutions counter is also provided to register positively or negatively the number of actuations of the accumulator numeral wheels 21 (Figs. 1 and 2). Revolutions counter numeral wheels 80 are suitably journalled in carriage 22 and are actuated by an actuator 81 on shaft 82 in a well-known manner to register the number of positive and negative registrations on numeral wheels 80.

*Carriage shift mechanism*

Means are provided for shifting the carriage in either direction from one ordinal position to another by power-driven means controlled by manually operable keys. The power-driven means includes a part of the actuating means for entering values into the accumulator register. Carriage 22 (Figs. 2 and 4) has plate 85 suitably mounted along the rear thereof and provided with vertical slots 86 formed by teeth 87. End slots 86 are formed in part by similar yieldable pawls 88, as shown in Fig. 4, which are urged into active position by springs 89. Slots 86 are adapted for engagement by opposite shift pins 90 on shift gear 91 suitably journalled on crossframe member 16. Shift gear 91 is rotated selectively in either direction through idler gear 92 to shift the carriage through any desired number of ordinal spaces by the cooperation of pins 90 and teeth 87. Shift gear 91 is centralized by means of centralizer arms 93 having spring 94 connected therebetween.

In order to rotate shift gear 91 selectively in either direction the two right-hand actuating shafts 31 (left-hand as seen in Figs. 4 and 5) are extended similarly to shaft 31, as seen in Fig. 1, and are provided with similar controllable drive connections with gear 91. Each connection includes a collar 98 fixed on the associated shaft 31 adjacent the end thereof and having diametrically opposed teeth for sliding engagement with corresponding slots of the shiftable collar 99 which is mounted for sliding movement at the end of shaft 31. Each collar 99 has a smaller tooth 100 in operative relation with a corresponding tooth on respective gear sleeves 101 and 104. Gear sleeve 101 is suitably journalled in cross-member 16 and plate 102 and carries gear 103 (Fig. 4) meshing with idler gear 92. Similar gear sleeve 104 has gear 105 which meshes with a wide gear 106, also in operative relation with idler gear 92. Thus, by selective shifting of collars 99 to establish a drive connection, rotation of actuating shafts 31 determines rotation of shift gear 91 in either direction and correspondingly shifting of the carriage 22 in either direction. Similar mechanisms are provided to control shifting of collars 99. Each mechanism includes a fork 110 (Fig. 5) at the rear end of similar rods 112 and engaging the associated collar 99. Rods 112 are slidably mounted in cross-members 17, 18 and are urged to the position shown by springs (not shown). Rods 112 (Fig. 6) have associated therewith respective arms 113 and 114 which are oscillated to shift rods 112 rearwardly by means including shift keys 115, 116 (Fig. 3) mounted for endwise movement on side member 13 and also suitably connected to engage clutch 34 and close the motor circuit. Thus, carriage 22 carrying numeral wheels 21 can be shifted selectively in either direction by depression of keys 115, 116. The foregoing mechanism is of the general type disclosed in the patent to Carl M. Friden No. 2,294,083 which issued August 25, 1942.

Resetting mechanism

Means are provided for restoring the machine to normal condition between successive operations by shifting the carriage to a predetermined position and by then effecting zero resetting of either the accumulator or the revolutions counter, or both of these registers, as determined by settable control means, the operation being carried out by power-driven means under control of a manually operable register return and resetting key. This mechanism is of the general type disclosed in the aforementioned Patent No. 2,294,083.

A conventional return and resetting key is operative, upon depression thereof, to establish a drive connection between the power-driven resetting mechanism and the actuating means and to initiate a carriage shifting and register resetting operation. The key is mounted in a suitable manner on a side frame in the machine for substantial endwise movement and is suitably connected to effect a rocking movement of shaft 121 (Figs. 1, 3 and 6) upon depression of the key.

To engage the drive, shaft 121 has depending arm 122 (Figs. 3 and 6) carrying a pin 123 engaging arm 124 pivoted on shaft 125. Arm 124 has finger 126 engaging a pin 127 in the lower end of a lever 128. Pin 127 serves, upon rocking of lever 128, to close motor contacts 133. Lever 128 is connected at its upper end by a pin engaging a slot of lever 129 pivoted at 130 on side frame 13. Lever 129 is connected at its upper end with a link 131 which is pivotally connected to the clutch engaging pawl 39 by a pin 132, so that rocking movement of the shaft 121 serves to rock lever 128 counter-clockwise and lever 129 clockwise to engage the clutch and close the motor contacts. Before the drive begins, the return and resetting key also controls the engagement of the shift and resetting drive connections.

To initiate the carriage return determined by a depression of the key, shaft 121 carries arm 136 (Fig. 6) having pusher link 137 pivoted thereon at 138 and urged downwardly by a spring 139. Spring 139 urges notched end 140 of link 137 into engagement with pin 141 carried by arm 142 secured on one end of sleeve 143 which is rotatable on shaft 146. At its other end and integral with arm 142, the sleeve 143 carries depending arm 144 which has a pin 145 abutting the forward end of left shift push rod 112 for control thereof. Thus, rocking movement of shaft 121 in the direction of the arrow in Fig. 6 serves to operate left shift push rod 112 to establish the shift drive connection for left-hand shifting of the carriage.

The rocking of shaft 121, upon depression of the resetting key, also serves to enable the drive connection from the actuating means to the resetting drive means mounted on the frame of the machine. For this purpose shaft 121 (Figs. 1 and 6), which is rocked upon depression of the key, carries arm 150 having pusher link 151 pivoted thereon at 152 and urged by spring 153 to engage its notched end 154 with rod 155 slidably mounted in brackets 17 and 18 and normally positioned as shown in Fig. 1 by a suitable spring (not shown). Pusher link 151 and arm 150 are similar to link 137 and arm 136, respectively. At its rearward end rod 155 (Figs. 1 and 4) carries fork 156 operatively engaged with shiftable toothed collar 157, similar to collars 199 of the shift mechanism and similarly mounted on one of actuating shafts 31. The teeth of collar 157 are engageable with the slotted end of sleeve 158 suitably journalled in bracket 16 and plate 159 secured thereon. Sleeve 158 (Fig. 4) carries cam 162 which is engaged by roller 163 on arm 164 pivoted at 165 on bracket 16 and urged toward cam 162 by spring 166. The upper end of arm 164 is slotted to engage roller 167 suitably journalled on pawl 168 pivoted at 169 on slide 170 mounted for endwise movement on bracket 16 by small brackets 171. When carriage 22 is in its left end position, as illustrated in Fig. 4, pawl 168 is in operative relation with arm 172 pivoted at 173 on bracket 174 depending from a resetting drive member comprising slide 175. Slide 175 has an L-shaped cross section and is mounted for endwise sliding movement on carriage 22 by spaced studs 180. Arm 172 has "live" one-way acting pawl 181 pivoted thereon intermediate its ends to cooperate with fixed ledge 182 mounted on bracket 16 to lift arm 172 out of the path of pawl 168 during movement of the carriage into its end position. Spring 183 urges arm 172 to the position shown against a suitable stop on the carriage frame. With the parts positioned as illustrated in Fig. 4, it is seen that upon movement of slide 170 to the left, lateral pawl 168 will engage the end of arm 172 to reciprocate resetting drive slide 175. The reciprocation of slide 175 is effected in the first cycle during which the carriage is in the end position shown in Fig. 4.

The return and resetting key may be latched in depressed position during shifting of the carriage to its end position if displaced therefrom, and the latch may be released during the first cycle of operation of the actuating means when in said end position as disclosed in said Patent No. 2,294,083 under control of override pawl 88 (Fig. 4).

Override pawl 88 also serves to interrupt operation of the shift and resetting drive connections after the first cycle (resetting cycle) following the shifting operation. For this purpose, slide 188 (Figs. 3, 4 and 6) is mounted for endwise movement on bracket 16 for operation by pawl 88 upon oscillation thereof by shift pins 90. Slide 188 overlies an arm of bellcrank 189 pivoted on shaft 58 journalled in plate 13 and pivotally connected to link 190, which is also pivotally connected to arm 191 depending from shaft 192 suitably mounted on the frame. Shaft 192 carries arms 193, 194 underlying pusher links 137 and 151, respectively.

Thus, upon rocking movement of override pawl 88 during the resetting cycle, the above-described linkage operates through arms 193 and 194 (Fig. 6) to lift pusher links 137 and 151, which results in release of left shift push rod 112 and resetting push rod 155, respectively, causing disengagement of the shift and resetting drive connections.

Multiplier keyboard

The selection mechanism for the multiplier factor is of the type disclosed in the afore-mentioned patents Nos. 2,371,752 and 2,399,917. Generally, such mechanism comprises a ten-key keyboard including numeral keys 200 (Figs. 7 and 8) and a pin carriage 201 associated therewith having ten ordinal rows of settable stop pins 202 and ten ordinal differentially adjustable elements 203 in the form of racks in which digits of the multiplier may be set successively for subsequent control of the multiplying operation. In order to set up the multiplier digits, each pin row includes eight pins corresponding to "1" to "8" keys and a fixed stop corresponding to the "9" key so that a depressed multiplier key operates through an associated selection lever 204 to set the corresponding pin of an aligned ordinal row to active or raised position. At the same time that a pin of the pin carriage is moved to active position, the aligned rack is released to move into engagement with the pin and thereby be set differentially in accordance with the value of the depressed key. Subsequently, the depressed key operates an escapement mechanism to be described hereinafter to move the pin carriage one ordinal step to the left, as viewed from the front of the machine, with respect to the keyboard selection mechanism.

In this manner the multiplier digits are set up in the multiplier selection mechanism, the "setting-up" operation beginning with the highest order digit of the multiplier in the embodiment illustrated.

*Multiplier carriage escapement mechanism*

As previously explained, the pin carriage is movable step-by-step transversely of the machine in accordance with the number of multiplier digits entered. The pin carriage is normally in its right end position, as viewed from the front of the machine, with indicating sectors 208 to the right of the multiplier keyboard. The pin carriage is spring-urged toward its left end, or operative, position by means of horizontally disposed bellcrank 210 (Fig. 7) which is pivoted at 211 on machine base 10 by means of an adjustable eccentric and has an upstanding arm 212 engaging right side plate 213 of the pin carriage. Another arm 214 of bellcrank 210 has a spring 215 secured thereto and extending longitudinally across the front of the machine, whereby the bellcrank is urged in a counter-clockwise direction as viewed from the top (as in Fig. 7) and correspondingly the pin carriage is urged from its right end position which it occupies when no multiplier value is set in the machine.

Normally, the movement of the pin carriage, under the influence of spring-urged bellcrank 210, is prevented by means of stop pawl 216 (Fig. 8) pivoted at 217 on an upstanding ear of lower keyboard plate 218, the nose of pawl 216 being urged upwardly into active engagement with a tooth 220 of the pin carriage escapement rack 221 (Figs. 7 and 8). Pawl 216 carries pin 222 (Fig. 8) underlying a tooth 223 of a pawl arm 224 pivoted at 225 on an upstanding ear of the lower keyboard plate 218. Pawl arm 224 is slotted longitudinally to receive pin 226 carried by arm 227 on rod 228 journalled in similar spaced ears of lower keyboard plate 218. Pawl arm 224 also carries laterally projecting tooth 229 which is normally urged by spring 219 to a position immediately above teeth 220, as seen in Fig. 8, and is disposed for downward movement between the pair of teeth adjacent to, and to the right of, that contacted by the nose of pawl 216.

Preferably the escapement shift is performed in two stages. One stage occurring during depression of a multiplier numeral key and the last stage occurring just before return of the key to raised position. When a multiplier key is depressed, shaft 228 is rocked by conventional means whereby arm 227 and pin 226 serve to rock pawl arm 224 about its pivot in a clockwise direction, thereby simultaneously lowering the tooth 223 and tooth 229 thereof into active position with respect to teeth 220 of the escapement rack 221. The engaging edge of the tooth 223 is spaced sufficiently above the pin 222 of stop pawl 216 to enable the setting of the pin 202 (Fig. 7) and release of the corresponding segmental rack 203 with a partial depression of a multiplier key 200. Upon further depression of the key 200, the tooth 223 engages the pin 222 of pawl 216 to rock pawl 216 (counter-clockwise as viewed in Fig. 8). It will be noted that the nose of pawl 216 is of sufficient length to remain in engagement with a tooth 220 until tooth 229 is moved into alignment with the adjacent tooth 220. As soon as the nose of the pawl 216 is disengaged from a tooth 220, the first stage of the shift step occurs and the pin carriage moves to the right, as viewed in Fig. 8, under the influence of the bellcrank 210 and the spring pressure thereon until the adjacent rack tooth 220 engages tooth 229 of pawl arm 224, upon full depression of the multiplier key. The movement of the pin carriage during this stage of a shift step corresponds to the space between the tooth 229 and the normal position of the rack tooth 220 adjacent thereto, the movement being sufficient to position the previously active tooth 220 over the nose of pawl 216, but insufficient to allow engagement of the projected finger 204 (Fig. 7) with the next pin row. Subsequently, as the depressed multiplier key is released, the parts start their return from an active position to the normal position shown in Fig. 8. Pawl 216, however, is held depressed by the associated tooth 220 and cannot return upwardly with the other parts until the inclined face of tooth 229 has permitted shifting of the pin carriage for an amount necessary to move the associated tooth 220 from over the nose of the pawl 216, so that the pawl 216 will move upwardly into engagement with the next tooth 220 to the left of the tooth with which it was engaged before depression of the multiplier key. Shortly before the depressed key is restored to its upper position, the one step shift is completed, whereby all of the pin setting and escapement shift parts will also be restored to normal position and the carriage will be conditioned for a subsequent shifting movement. The timing of the escapement operation provides for shifting of the pin carriage, substantially at the end of the return of the depressed key, and insures restoration of all the pin setting parts to a position out of the path of the pin carriage before the major part of the shifting movement thereof is effected.

From the foregoing description it will be seen that each time a multiplier selection key is depressed, the aligned rack segment and selected pin of the pin carriage are set, while, at the same time, the carriage has escaped one step toward the left of the machine. This operation is repeated as the various digits of the multiplier are set into the machine. If a mistake is made in setting a multiplier digit, such mistake can be corrected by resetting the multiplier racks, as will be described hereinafter.

In the right-hand, or normal inactive, position of the pin carriage 201, each of the multiplier rack segments 203 are latched in their "0" indicating position. Therefore, the pin carriage 201 has but to be ordinally shifted from its inactive to its active position with each depression of the elongated "0" key 200-a, which is positioned immediately below the first row of keys 200 of the ten-key keyboard. Thus, each depression of the "0" key 200-a serves only to rock arm 227 (Fig. 8) to control the escapement mechanism described supra. In the normal position of the parts, as shown in Fig. 8, it can be seen, however, that rocking movement of the pawl 216, independent of the pawl arm 224, will serve to disengage the nose of pawl 216 from the associated tooth 220 of the carriage escapement rack 221, thereby releasing pin carriage 201 for unrestrained movement to the right, as viewed in Fig. 8. Such an independent rocking movement of the pawl arm 216 by mechanism to be hereinafter described will serve to actively position a predetermined number of the rack segments 203 and their associated indicating sectors 208 in a "0" registering position.

*Multiplier rack restoring means*

The differentially adjusted positions of racks 203 are utilized to control the number of registrations of the multiplicand in the accumulator, to control the ordinal shift of the accumulator from left to right after multiplication by each multiplier digit for a correct registration of the next ordinal product and to control the shift of the pin carriage, so that the next higher order rack 203 comes into controlling position with respect to the operation of the machine. To enable exercise of the above control, means is provided for returning each adjusted rack, step-by-step, to its initial, or "0," position, this operation being successive from the adjusted rack of the lowest order with the shifting of the accumulator and the multiplier pin carriage following the last step of movement of each rack to condition the machine for operation in the next higher order.

The operating mechanism for the racks comprises feed pawl 235 (Fig. 7) which is pivotally secured at 236 to the end of an arm 237 pivoted at 238 on the frame 12. Pawl 235 is urged in a counter-clockwise direction, as viewed in Fig. 7, by spring 239 which is attached at one end to lug 240 of pawl 235. Lug 240 is spaced from arm 237 in the inactive position of pawl 235 and engages arm 237 to limit the rocking movement of the pawl upon movement to active position. Pawl 235 is held in inactive position by its upward extension 241 engaging behind holding pawl 242 secured at the end of shaft 243 which is suitably pivoted in the framework. Both pawls 235 and 242 are maintained inactive until the multiplying operation is started, the inactive position being shown in Fig. 7.

In order to actuate pawl 235, arm 237 is pivotally connected to pitman 244 which engages an eccentric cam (not shown) secured on drive shaft 32 between disks 245. Pitman 244, arm 237, and pawl 235 are reciprocated once for each cycle of rotation of drive shaft 32 and the operation of the pawl 235, in its active position, occurs at the beginning of each cycle. However, the pawl 235 is held in its inactive position until holding pawl 242 is allowed to move in a counter-clockwise direction from the position shown in Fig. 7 by oscillation of shaft 243.

*Multiplication keys*

The condition of the machine for the multiplying operation as controlled by the multiplication operation keys will now be described. Referring to Figs. 8, 9, 10 and 11, when one of keys 250, 251 or 252 is depressed and latched in depressed position, several functions of the machine are set into operation selectively in accordance with the type of operation determined by the key depressed. These functions include enabling of the control which determines the sign character of the registration of the product, enabling of the power set means for operating the sign character control, enabling of the carriage shift mechanism to determine return of the carriage to an end position, selective enabling of the resetting mechanism for the accumulator and the revolutions counter, setting the control for enabling feed pawl 235 for the multiplier racks, engaging the clutch and enabling the motor circuit. The mechanisms performing these functions and their relation to multiplication keys 250, 251 and 252 will now be described.

Keys 250, 251 and 252 are mounted for endwise sliding movement in respective keyboard plates 218 and are urged to raised position by respective springs 254 disposed on the slotted key pins and compressed between the key and lower plate 218. The raised position of the respective keys is determined by the respective latch arms 255 engaging the underface of upper plate 218. At their outer end, latch arms 255 are provided with respective latching teeth for engagement with a single latching tooth 256, 257 (Figs. 7 and 10) on respective latch levers 258, 259 secured on transverse shaft 260 which is suitably journalled in auxiliary frame plate 261 and vertical frame plate 262 of the machine. Latch levers 258 and 259 are urged in a counter-clockwise direction, as viewed in Fig. 10, by spring 263 suitably tensioned between the frame and the lower end of lever 258. The lower end of lever 258 is also operatively related with an arm of bellcrank 210, whereby the latch for the depressed key 250, 251, or 252 can be released at the end of the multiplying operation, as later described. Suitable interlocking means may be provided for preventing simultaneous depression of the keys.

*Registration sign character control*

Means are provided under control of the multiplication keys for selecting the sign character of the registration of the product in the accumulator to be positive if keys 250 or 252 are depressed and to be negative if key 251 is depressed, such means being enabled by depression of a selected key and subsequently operated by power means, also enabled by depression of the key. Similar pins 270 (Figs. 10 and 11) of keys 250 and 251 extend through the adjacent frame plate and engage in respective slots in the forward ends of levers 271, 272, respectively, which are offset laterally intermediate their ends to extend beyond the adjacent plate 262 and have their hubs pivoted on shaft 273.

Lever 271 (Figs. 10 and 11) has a pin 274 at its rearward end engaging a vertical slot in arm 275 pivotally mounted at 276 to the frame. Arm 275 is connected by spring 277 with positive setting arm 278 which is pivoted at 279 to power setting means therefor, in the form of bellcrank 280 pivoted at 281 on frame plate 12. Arm 278 is urged upwardly by spring 277 against a roller 282 on arm 275 so that, in effect, arms 275 and 278 move with lever 271 upon depression of key 250. At its rearward upwardly offset end, arm 278 has notch 283 for engagement with the pin 284 at the upper end of lever 285 secured on the end of transverse shaft 58, whose rocking movement, as previously described, moves gate 59 to control the engagement of the plus-minus gears with the numeral wheel gears and, therefore, controls the sign character of the registration.

Normally, notched end 283 of arm 278 is maintained below pin 284, but can move to active position and into engagement with pin 284, under the influence of spring 277, when key 250 is depressed to move lever 271 to active position. It will be noted that spring 277 provides a yieldable connection, whereby arm 278 can be held against movement to active position or moved from active position. Arm 278 engages pin 290 on lever 291 pivoted at 292 on the frame and having ear 293 overlying stop 294 on pin carriage 201 in the right-hand position of carriage 201 or the active rack 203 in any shifted position of the carriage. Therefore, unless a value is set into the pin carriage, no setting of arm 278 can be made. Similarly, the rearward end of lever 272 (Figs. 7 and 11), which is associated with minus multiplication key 251, is connected by spring 295 to arm 296 which is urged against pin 297 on lever 272. Arm 296 is pivotally connected at 279 to actuating bellcrank 280 and has its downwardly offset notched end 298 for engagement with pin 299 at the lower end of lever 285. Arm 296 also has an upward extension engaging pin 290 on lever 291.

Thus, it will be noted that depression of key 250 rocks arm 271 to raise the rearward end thereof to allow notched end 283 of arm 278 to move into engagement with pin 284, whereby, upon subsequent counter-clockwise movement of bellcrank 280, lever 285 and shaft 58 will be moved to mesh the plus gears with the numeral wheel gears. Similarly, if key 251 is depressed, lever 272 serves to control the engagement of notched end 298 of arm 296 with pin 299, thereby conditioning the plus-minus control mechanism to determine negative registration of the product in the accumulator. As explained above, however, the arm 278, or arm 296, can only move to active position if lever 291 is free for movement because of entry of a value into the multiplier pin carriage 201.

Referring now to Figs. 7 and 10, key 252 overlies a roller 300 of arm 301 pivotally mounted at 302 and integrally connected with arm 303. Arm 303 is pivotally connected at its lower end with link 304 which extends rearwardly and is pivotally connected at its rearward end with bell crank 305 pivoted at 306 on the frame. The horizontal arm of bellcrank 305 is pivotally connected to link 307 which is also pivotally connected to arm 275 so that counter-clockwise movement (Fig. 10) of arm 303 pulls link 304 forwardly and rocks bellcrank 305 in a counter-clockwise direction to lift arm 275 to tension spring 277, so that arm 278 is urged upwardly to engage notched end 283 with pin 284. The slotted connection of pin 274 with arm 275 provides for selective tensioning of spring 277 from key 250 or key 252.

Thus, each of keys 250, 251 and 252 controls the setting of linkage, which, in turn, will cause setting of the plus-minus gears upon oscillation of power setting bellcrank 280. To effect power setting of the plus-minus bears by oscillation of bellcrank 280, roller 312 is provided on bellcrank 280 (Fig. 10) for cooperation with power setting cam 313 which is slidably and non-rotatably mounted on shaft 32 by a suitable slidable driving connection. Cam 313 is normally urged to inactive position by a spring compressed between the cam and a disk secured on shaft 32 for a purpose not pertinent to the instant invention.

Cam 313 (Fig. 11) is engaged by a suitable roller at the upper end of lever 314 pivoted at 315 on an ear formed at right angles to frame plate 262 and having its lower cam end engaged by roller 316 carried at the end of lever 317 pivoted at 318 on frame plate 262. Lever 317 is spring-urged in a clockwise direction, as viewed in Fig. 11, through its pivotal connection at 319 with bellcrank 320 which is pivoted at 321 on the frame. Bellcrank 320 is urged in a counter-clockwise direction by spring 322, therefore also placing lever 317 under a clockwise urgency.

Means are provided for preventing such clockwise movement of the lever 317 to enable the power setting operation, such mechanism being first conditioned by operation of one of the multiplier keys and then subsequently enabled at the end of the shifting or shifting and resetting operation. The forward end of lever 317 is provided with an offset ear engaged by the upper arm of bellcrank 323 pivoted at 324 on the frame and urged in a counter-clockwise direction by spring 325. Thus, bellcrank 323 latches lever 317 against operative movement. For releasing latch bellcrank 323, U-shaped lever 326 secured on shaft 302 is provided with pin 328 overlying the horizontal arm of bellcrank 323 and roller 329 lying under extended portions of levers 271, 272 which are operated by the key depression, and also under an extension of lever 317. Therefore, upon depression of key 250, or 251, the vertical arm of bellcrank 323 is moved from beneath the end of lever 317. However, this merely conditions the lever 317 for operation as it is still maintained inoperative by the engagement of latch lever 330 with roller 331. Lever 330 is secured on the shaft 332 journalled in the frame plate 262 and is urged in a clockwise direction by spring 333. To control the conditioning of power setting enabling lever 317 from the key 252, U-shaped lever 326 is rocked through shaft 302 and arm 334 pinned thereon (Fig. 7).

As explained hereinafter, shaft 332 (Fig. 11) carrying pawl 330 is oscillated at the end of the carriage shifting or carriage shifting and resetting operation to disable latch pawl 330 with respect to pin 331 to enable the power setting operation.

To prevent relatching of a multiplication key in depressed position if held there after the multiplying operation, latch lever 330 has pivotally mounted thereon at 340 a bellcrank 341 carrying a pin 342 overlying the lower arm of U-shaped lever 326. Bellcrank 341 is urged in a clockwise direction by spring 335 and has its upright end adjacent, and normally above, square pin 343 on arm 344 secured on shaft 260, which also carries key latch arms 258, 259 (Figs. 7 and 10). As previously explained, the shaft 260 is operated upon depression of a multiplication key so that it will rock arm 344 upwardly and immediately downwardly when the key latch engages so that pin 343 provides a stop for bellcrank 341. Subsequently, when the key release mechanism is operated, if the key is maintained depressed, i. e., lever 326 does not operate to restore bellcrank 341, the upright arm of bellcrank 341 will move under pin 343 to maintain the key latch inactive.

At the end of the carriage shifting or carriage shifting and resetting operation, the power setting bellcrank 280 is moved to active position and means are provided for latching said bellcrank and the plus-minus gears controlled thereby in active position. Such means may comprise latch arm 348 (Fig. 10) pivoted at 349 on plate 12 and urged in a counter-clockwise direction by a spring (not shown). Latch arm 348 has notched lower end 350 for engagement with square pin 351 on bellcrank 280. Thus, the bellcrank 280 can be latched in active position where its lower end is moved away from stop 352. The latch arm 348 can be moved to inactive position by arm 353 in a manner later described.

*Carriage return and resetting control*

Upon depression of either of multiplication operation keys 250 or 251, means are brought into play to first determine shifting of the carriage to its left end position as a preliminary to the multiplying operation. Where a resetting operation is desired, key 252 is operated and a return and resetting operation may be performed to selectively zeroize the accumulator, or the counter, or both, in accordance with the adjustment of a conventional resetting control mechanism.

Key 252 (Figs. 1, 6 and 7) carries pin 356 which engages the slotted end of lever 357 pivoted at 358 on frame plate 261. Lever 357 carries pin 359 engaging arm 150 secured on shaft 121. Arm 150, as previously described, operates through pusher link 151 to move push rod 155 of the resetting mechanism to operative position so that, upon depression of the key 252, push rod 155 engages the resetting drive connection. At the same time, the oscillation of shaft 121 serves to oscillate arm 136 carrying pusher link 137 which operates, through pin 141 and depending arm 142, sleeve 143, arm 144, and pin 145, to move left shift push rod 112 into position to engage the left-hand shift mechanism. The oscillation of shaft 121 also operates through arm 122 and pin 123 to oscillate arm 124 pivoted on shaft 125 when finger 126 of arm 124 (Fig. 3) engages pin 127 at the lower end of lever 128 for rocking movement thereof to close the motor circuit and engage the clutch.

The shifting mechanism will operate until the carriage reaches its left end position, and with the resetting mechanism being enabled during the first cycle of operation with the carriage in its left end position, a resetting operation will occur. During the resetting operation, override pawl 88 (Fig. 4) will be operated to engage slide 188 to move it downwardly. Slide 188 (Fig. 3) operates bellcrank 189, link 190, and arm 191 (Figs. 1, 3 and 6) depending from cross shaft 192. Shaft 192 operates through arm 193 to raise pusher link 137 out of operative engagement with pin 141 and thereby disables the shift mechanism. Shaft 192 also operates through arm 194 to lift push link 151 to disengage the resetting control from the resetting push rod 155. At the same time that arm 194 lifts the push link 154, it operates lever 362 pivoted on shaft 121 which is pivotally connected to link 363 having a pivotal connection at its other end to arm 364 on shaft 332. As seen in Fig. 11, shaft 332 also carries latch pawl 330, so that this movement rocks the latch pawl 330, releasing the power setting control lever 317 to enable power setting of the plus-minus gears and beginning of a multiplying operation.

Keys 250, 251 operate generally in the same manner to initiate the multiplying operation with a return of the carriage to its left end position. The respective levers 271, 272 operated by keys 250 and 251, overlie pin 365 (Fig. 11) carried by lever 366 which is mounted similarly to levers 271, 272 on shaft 273. Lever 366 has pin 367 engaging a forked end of link 368 pivotally connected at its lower end on shaft 370. Shaft 370 (Fig. 6) carries arm 371 having spring-urged pusher link 372 pivoted thereon with its notched end engaging pin 373 carried by arm 374 depending from shaft 146 which carries arm 114 controlling the left-hand shift mechanism.

Thus, upon depression of either of keys 250 or 251, the operation starts with carriage shifting, but the resetting mechanism is inactive so that the amount entered is accumulative to the amounts in the accumulator and the counter. The depression of either of keys 250 or 251, through the movement of the lever 366 and link 368, also serves to operate bellcrank 375 (Fig. 11) which is secured on shaft 125. At its other end shaft 125 carries upstanding arm 376 (Figs. 3 and 6) having its upwardly extended forked end engaging a pin on clutch-engaging slide 377 mounted for endwise movement on similar studs 378 in the frame, and pivotally connected at 132 to clutch-engaging pawl 39 so that it engages the clutch and also closes the motor circuit.

From the above it is seen that either of multiplication keys 250 or 251 will start operation of the machine to return the carriage to its left end position. During the overstroke cycle, with the carriage in its left end position, no resetting operation occurs, but override pawl 88 operates through slide 188, bellcrank 189, link 190, arm 191, and shaft 192 to rock arm 194 and therefore shaft 362 when pin 379 thereon, underlying pusher link 372, lifts link 372 out of engagement with pin 373 and thereby disables the shift connection to the left shift mechanism. At the same time, rocking of arm 362 operates through link 363 and arm 364 to rock shaft 332, thereby moving latch pawl 330 (Fig. 11) to release the power setting control 317 in the same manner as described in connection with key 252.

*Multiplier feed enabling mechanism*

At about the time the power setting operation of the plus-minus gears is effected, the feed pawl for the racks of the pin carriage is also enabled. To enable the feed pawl 235 by release of the holding pawl 242, shaft 243 (Figs. 7 and 11) upon which holding pawl 242 is mounted, carries arm 380 having pin 381 engaging the slotted end of arm 382 pivotally connected at its other end on pin 319 of the lever 317 for movement therewith. Pin 381 is also engaged by a spring 383 which constantly urges arm 380 and shaft 243 to move the holding pawl 242 in a counterclockwise direction, as viewed in Fig. 7. Therefore, upon release and operation of power setting lever 317, arm 380 and the holding pawl 242 are also released to allow the feed pawl 235 to move into engagement with the aligned rack 203 for control thereof.

*Accumulator and pin carriage shift control*

As pointed out, irrespective of which key 250, 251, or 252 is depressed, after the initial carriage return or carriage return and resetting operation, the multiplying operation proceeds in the same manner once it is enabled by the overstroke of the shift mechanism upon return of the carriage to the left end position. It will be recalled that upon such overstroke, the power setting means for the plus-minus gears is brought into play and also the step-by-step return of the aligned multiplier rack 203 to "0" is enabled by movement of pawl 235 to active position. During the multiplying operation, power setting bellcrank 280 is latched in active position by the engagement of pin 351 with latch arm 348 to maintain the plus-minus gears in operative engagement.

During its last step of movement the active rack 203 engages lever 291 (Figs. 7 and 10) when pin 290, overlying the upper end of arm 278 and 296, moves the operatively positioned arm 278 or 296 out of engagement with the respective pin 284 or 299 to allow the lever 285, shaft 58, and the plus-minus gears to restore to their neutral position for a shifting operation under control of their usual centralizing means. This release is effected before completion of the registering operation, but lever 285, shaft 58, and the plus-minus gears are held in engagement until the end of the last registering cycle by a conventional form of cycle lock (not shown). The oscillating movement of lever 291 also serves through link 390 to lower hooked arm 391. Arm 391 is constantly oscillated during multiplication by the engagement of the pin 392, carried by cam disk 313, with arm 393 to which arm 391 is pivotally connected. By such lowering, the hook end of lever 391 can engage the pin 394 on latch pawl 395 which is pivoted at 396 and is normally urged into latching engagement with lever 353 secured on shaft 397 by a conventional spring means not shown. Release of the latch 395, therefore, enables arm 353 connected by link 398 with centralizing lever 399 pivoted on shaft 306 to move the slotted end 400 of lever 399 into engagement with the pin 299 of the lever 285, so that during the shifting cycle the lever 285, shaft 58, and plus-minus gears are positively held in their centralized positions where they are moved by the well-known form of centralizing mechanism.

The rocking movement of arm 353 and shaft 397 also serves through arm 404 secured thereon and link 405 (Fig. 10) to rock arm 406 on shaft 243 which carries holding pawl 242 and therefore moves the actuating pawl 235 to inactive position during a shifting cycle. The rocking of shaft 397 also serves to engage the accumulator right shift mechanism and for this purpose has arm 407 (Fig. 6) slidably and nonrotatably engaged thereon. Arm 407 is normally out of alignment with pin 408 controlling right shift push rod 112, the arm 407 being held against the urgency of spring 409 by slide 410, which is slidably mounted on shaft 397 and abuts shift rack 411 of pin carriage 201. The first step of shifting movement of carriage 201 during setting-up of the multiplier is insufficient to align arm 407 with pin 408 and such alignment occurs only after the second shift, i. e., when the second multiplier digit is entered, which is the extent of sliding movement permitted slide 410 and arm 407. Shaft 397 also carries arm 412 (Fig. 7) having pin 413 engaged in the grooved collar 414 carrying slidable actuator 415 for control of shift rack 411 of the pin carriage 201, so that this shift is also enabled by the same rocking movement of shaft 397 against the urgency of spring 416 (Fig. 6) connected to arm 407. Actuator 415 is driven from shaft 417 as described in said Patent No. 2,371,752.

The accumulator and pin carriage shift mechanisms, during the multiplying operation, are disabled after one cycle of movement, i. e., one ordinal shift, if a value other than "0" is set in the next active multiplier rack 203. Restore arm 404 (Fig. 10) lies out of the path of pin 392 on disk 313 in the latched position of arm 353, as seen in Fig. 10. However, upon delatching of arm 353 and rocking of arm 353 and shaft 397, arm 404 is positioned for operation by pin 392 and during the shift cycle is engaged by pin 392 to restore arm 353 for latching engagement by latch pawl 395 under the influence of its spring (not shown).

Power setting bellcrank 280 is also delatched during the shift cycle by the engagement of lever 353 with pin 418 on latch lever 348, so that the plus-minus gears which are in inactive position during shifting can be reset by bellcrank 280 and cam disk 313 at the beginning of the next cycle, if the next active multiplier rack 203 is set to a multiplier digit value. If rack 203 is not set, i. e., is at "0", another shifting cycle follows immediately by the positioning of lever 291, as previously described.

Multiplier correction key 253 for erasing amounts set into the multiplier pin carriage without entry of values into the accumulator or counter, may be similar to and operate in the same manner as shown in said Patent No. 2,371,752.

Multiplication key release

The release of a depressed multiplication key is controlled in the manner disclosed in said Patents Nos. 2,371,752 and 2,399,917. Briefly, as the pin carriage 201 is shifted ordinally to its normal inactive position where the leftmost indicating dial is to the right of the multiplier keyboard, the resulting rocking movement of the spring-urged bellcrank 210 (Fig. 10) operates through one arm thereof to engage the lower end of lever 258 of the key latch assembly, thereby moving latch teeth 256 and 257 out of engagement with the depressed key which is therefore free to rise. Bellcrank 210 is held in delatching position by the pin carriage until a multiplier factor is entered into the carriage. It will be understood that upon depression of any multiplier key 200 the pin carriage is ordinally shifted under the control of its escapement mechanism so that bellcrank 210 is disabled with respect to the multiplication key latch mechanism. This is true, whether or not the keys 200 from "1" to "9" are used in entering a multiplier digit, or whether the "0" key 200–a is used in order to control an accumulator carriage tabulation to a selected ordinal position.

Automatic decimal insertion

Means are provided for automatically causing a registration of one or more products around a selective decimal position irrespective of the number of decimal places in each multiplier and/or multiplicand. In performing a series of multiplication operations in which some or all of the factors involved are decimalized, the multiplicand having the greatest number of decimal places is first determined to establish the decimal point position in the keyboard of each subsequent multiplicand to be entered. The entry of each multiplier factor selectively functions to tabulate the product register to a position relative to the decimal point position in the keyboard. Therefore, each product may be accumulated around a common decimal point. For example, in the computation of tax, the multiplicand, or commodity prices is entered into the keyboard with the decimal point between the second and third rows of keys 26, while the tax, which becomes the multiplier, is entered into the multiplier pin carriage preceded by a manipulation of a selective means to invariably determine the two decimal places most generally apparent in a tax value. The tax on each item is therefore automatically accumulated in the proper decimal position in the register. Likewise, in accumulating the cost of a number of items, the number of each item is entered in the right-hand orders of keys 26, while the cost of one item is entered in the multiplier pin carriage. The cost of each of such items may vary in the number of decimal places involved, that is, one item may cost .11 cents each, whereas another may cost .1225 cents, therefore, the .1225 cent item determines the number of decimal places in each multiplier or item cost entered. Thus, in computing the quantity price of the .11 cent item, selective means are operated to automatically include two zeros in the multiplier which then becomes .1100. Upon initiation of the multiplication operation, the product register is first shifted two orders to the right prior to the registration of the product, thereby enabling accumulation of the products in the correct decimal position in the register.

In the normally inoperative position, i. e., the right-hand position of the pin carriage 201, it will be recalled that all of the segmental racks 203 are latched in their "0" position. Upon depression of a multiplier key 200, the leftmost rack in the pin carriage 201 is released and each rack to the right thereof is successively released with each multiplier key depression. Substantially simultaneously with the positioning of each rack 203, depression of the value key serves to control the escapement mechanism, thereby effecting an ordinal shift of the pin carriage to the left to align the now active rack with the feed pawl 235 (Fig. 7). As previously disclosed hereinabove, however, when a "0" occurs in the factor to be entered into the multiplier mechanism, depression of the "0" key 200–a operates to control the escapement alone and thereby effect an ordinal left shift of the pin carriage 201 with the corresponding rack in its latched position. If stop pawl 216 (Fig. 8) associated with the escapement mechanism is disabled, pin carriage 201 and racks 203 will be shifted to an extreme left position or to a predetermined ordinal position as described hereinafter. Each such rack, when actively positioned with respect to feed pawl 235, operates in a conventional manner to immediately effect an ordinal right shift of the product register and the pin carriage during the multiplying phase of the operation. Means for automatically determining the decimal places in each multiplier factor will now be described.

A supporting member 425 (Figs. 10, 11, 12 and 13) in the form of a channel is mounted above, and in operative relation with, the multiplier pin carriage 201. Member 425 has similar forwardly extending portions 426 of each flange secured at their forward ends at 427 to ears formed at right angles to upper keyboard plate 218. At its rearward end the channel member 425 is supported by a rod 428 which is secured at its respective ends in frame plates 12 and 262. To prevent any malformation or warping of the member 425, the forward edge 429 and the rearward edge 430 of the web 431 are formed downwardly at right angles thereto with the downwardly extended portion 429 serving as a mounting for a bracket 432 as at 433 (Fig. 13).

Means are provided for selectively terminating the movement of the pin carriage 201 (to the left as viewed in Fig. 12) in either of two positions upon manipulation of an operational control switch. For this purpose, a T-lever 434 (Figs 10, 12, 13 and 14) is slidably mounted for rocking movement on bracket 432 as as 435. One arm 436 of lever 434 serves as an armature for selective control by the respective electromagnets 437, 438 to determine a respective clockwise or counter-clockwise rocking movement of lever 434. A second arm 439 of the lever 434 has a notch 440 therein with the shoulder 441 of the notch lying parallel to, and spaced from, the extreme end 442 of the arm 439 a distance equal to two ordinally shifted positions of the pin carriage 201. A third arm 443 of the T-lever 434 carries an arcuate shoe 444 formed at right angles to the end of the arm and having two spaced notches 445 (Fig. 14) in the outer periphery thereof for engagement by a stud made of any suitable insulating material and secured to one end of the center leaf of a conventional single pole double throw switch 446. Each of the notches 445 serve as a detent for the lever 434 to retain the lever in either of its adjusted positions.

Referring now to Figs. 10, 12 and 15, pin carriage 201 carries a pin rack, shown generally at 450, and supported at its ends by brackets 451, 452 secured on either side of pin carriage 201 for movement therewith. Rack 450 is in the form of a channel 453 lying transversely above the multiplier sectors 203 and parallel to the shaft 454 upon which the sectors are rotatably mounted. Each flange of the channel 453 is provided with a similar row of aligned slots to receive pins 455 for limited endwise sliding movement as determined by the V-shaped end portion 456 of a U-shaped spring 457 engaging in a latching notch 458 of each pin, as seen in Fig. 15, such spring being compressed between the pin and the web of the channel and operative to retain the pin in either its operative or inoperative position. Each pin 455 is provided with a vertical slot 459, which, in the operative position of the pin, extends above the upper flange of the channel 453 for use in restoring the pin to its upper inoperative position in a manner later described.

Referring now to Figs. 12 and 13, the pin rack 450 is mounted on the pin carriage 201 for transverse movement therewith and the row of pins 455 lies in a linear plane with the selectively positioned shoulder 441 or 442 of the zero stop arm 439. In the inoperative, or upper, position, the pins 455 are ineffective to engage the operatively positioned shoulder 441 or 442, thereby enabling a convenional operation of the multiplying mechanism. However, upon the downward projection of a selected pin 455, as seen in Fig. 10, the lower end thereof becomes effective to engage the adjusted shoulder 441 or 442 to terminate movement of the pin carriage 201 in an ordinally operative position as determined by the adjustment of the zero stop lever 434. The spacing of the pins 455 in the channel 453 corresponds to the ordinal spacing of the rack elements 203 of the pin carriage with the leftmost, or highest order, pin spaced from, and to the right of, the shoulder 442, in the normally inoperative position of the pin carriage, a distance equal to the spacing of two sectors 203. Thus, it can be seen, that upon setting of the leftmost pin to its operative position, the pin carriage 201 may be moved two ordinal positions to the left, whereupon the active pin engages the shoulder 442 or, in the position of the stop lever 434 as shown in Figs. 12 and 13, the pin will engage the shoulder 441 following a four ordinal movement of the pin carriage.

Means are provided for selectively setting one of the pins 455 in any ordinally shifted position of the pin carriage 201 representative of the decimal position in the multiplier factor being entered therein. For this purpose, a setting arm 464 becomes operative upon energization of an electromagnet 465 to rock an armature 466 (Figs. 10 and 12) in a clockwise direction to the position shown in Fig. 10, whereupon the arm 464, integral with armature 466, serves to move the ordinally aligned pin 455 to its active position. The controlled pin is retained in this downwardly projected position by the engagement of the V-nosed detent 456 with the upper notch 458 of the pin. Electromagnet 465 is suitably mounted on the top surface of the web 431 of the supporting member 425 in a position such that the nose of the laterally extending arm 464 overlies the pin 455 corresponding to the multiplier sector 203 next to be moved to its active position with respect to feed pawl 235 (Fig. 7), i. e., the inoperative sector 203 immediately to the right of the feed pawl 235. Arm 464 and therefore armature 466 is normally urged to an inoperative position with respect to pins 455 by means of a conventional torsion spring (not shown) on the armature shaft 467, one end of which rests against the inner face of the armature and the other end of which lies against the base 468 of the electromagnet mounting bracket 469.

The entry of the whole number of a decimalized multiplier factor is effected by a manual depression of the multiplier keys 200 in a well-known manner, wherein each digit of the factor, from the highest to the units digit, is successively entered and the pin carriage is escaped one ordinal position to the left with each entry. Upon the occurrence of the decimal point in the factor, however, one of two switches 484 or 485 (Fig. 14) is selectively closed to energize respective electromagnets 437 or 438 and pin setting electromagnet 465. Closure of switch 484 operates to energize electromagnet 437 to rock the armature 436 and therefore T-lever 434 in a clockwise direction and also serves to energize electromagnet 465, thereby actuating pin setting arm 464 (Fig. 12) to set the pin 455 associated with the next lower order multiplier sector 203 to be moved into active position with respect to feed pawl 235. The clockwise rocking of the lever 434 positions the shoulder 442 (Fig. 13) for engagement by the set pin 455, thereby limiting further movement of the pin carriage 201 to two ordinal positions. Similarly, closure of the switch 485 serves to cause energization of the electromagnet 438 (Figs. 13 and 14) to rock the T-lever 434 to the position shown, thereby moving the shoulder 441 into alignment with the row of pins 455. Simultaneously, with the energization of the electromagnet 438 the switch 485 operates also to cause energization of the electromagnet 465 to position a pin 455 for engagement with the shoulder 441 of the stop arm 439, thus limiting the movement of the pin carriage 201 to four ordinal positions. The predetermined control of the ordinal pin carriage movement, however, is not to be limited to this embodiment of the invention as disclosed herein, since it becomes readily apparent that the arm 439 may have similar shoulders 441, 442 operable to limit the movement of the pin carriage 201 to any combination of ordinal positions from "1" to "10," such as 1 and 3, 4 and 6, et cetera.

In the embodiment shown, each of the switches 484 and 485 is selectively controlled by a lever 486 (Fig. 14) which is suitably mounted on the machine frame adjacent the multiplier keyboard and is rockable clockwise about a pivot 487 to close switch 484 or counter-clockwise to close switch 485. It will be understood that each of these switches may be automatically controlled by the columnar positioning of a typewriter carriage such as diclosed in the "Computyper" machine, wherein a tab, or wiper, on the carriage becomes operative to close either of the switches upon shifting of the carriage following entry of the units digit in the selected columnar position.

Upon the engagement of a projected pin 455 with a selected shoulder 441 or 442, lever 434 becomes operative in either detented position thereof to initiate a multiplying operation, as will now be described. In the normally inactive position of the pin carriage 201, as viewed in Fig. 12, it will be recalled that all the segmental racks 203 are normally latched in their "0" position. A depression of the "0" multiplier key 200-a, therefore, operates to control only the escapement mechanism, thereby effecting an ordinal left shift of the pin carriage 201 to its active position, whereupon the latched rack, or sector, 203 becomes operative under the control of the feed pawl 235 to immediately effect a right shift of the product register and the pin carriage as described supra. It is therefore readily apparent that a disablement of the stop pawl 216 (Fig. 8) associated with the escapement mechanism will immediately release the pin carriage 201 to an extreme left-hand position, as viewed in Fig. 12, or to a predetermined ordinal position controlled by the engagement of a set pin 455 with the shoulder 441 or 442.

Figure 16:
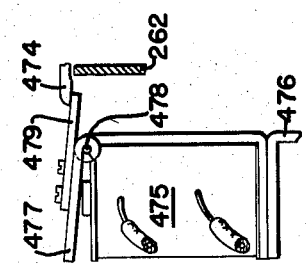
Fig. 16 is a detail of the electromagnetic control for disablement of the escapement mechanism.

Means are provided for disabling the stop pawl 216 (Figs. 8 and 12) to enable an unrestrained movement of the pin carriage 201 under the control of bellcrank 210 and spring 215 (Fig. 10). Stop pawl 216 is provided with an arm 474 laterally extended through an opening in the frame plate 262 for control by an electromagnet 475 (Figs. 11, 12 and 16) mounted on a vertical bracket 476 secured to the base 10 of the machine. Bracket 476 also serves to mount an armature 477 hinged thereto at 478 and operable to be rocked counter-clockwise, as viewed in Fig. 16, upon energization of the electromagnet 475. Armature 477 carries an arm 479 extending beyond the hinged portion thereof for an underlying engagement with the arm 474 of the stop pawl 216. Upon counter-clockwise rocking of the armature 477, the arm 479 serves to rock pawl 216 (Fig. 8) counter-clockwise, thereby releasing the nose of the pawl from engagement with the teeth 220 of the pin carriage rack 221 (Fig. 7). Thus the pin carriage 201 is free to move unchecked to the left, as viewed in Fig. 12, to an operative ordinal position as determined by the setting of the lever 434. To control the energization of the electromagnet 475, a switch 488 (Fig. 14) is provided in the embodiment shown, which switch is operative to be closed by the manual depression of a key, or push button, 489 suitably mounted in the machine frame. Energization of the electromagnet 475 may, however, be remotely controlled by the closure of switch 488 upon operation of the "tab" key on a typewriter when used in combination with a calculating machine of the character described supra, such a combination being similar to that of the "Computyper" computing machine. The pin carriage 201 serves to initiate a multiplication operation upon disablement of the stop pawl 216 when a set pin 455 engages shoulder 441 or 442 in the respective detented position thereof. Upon engagement, the projected pin serves to move the lever 434 laterally against the urgency of a spring 490, guided in its movement by a slot therein embracing the stud 435. When so moved, the lever 434 operates to open the normally closed contacts 491 of the single pole double throw switch 446 (Fig. 14) to de-energize the electromagnet 475, thereby enabling the spring 219 (Fig. 8) to restore the nose of the stop pawl 216 to its operative position between the two teeth 220 of the pin carriage rack corresponding to the operatively moved position of the pin carriage 201. Upon de-energization of the electromagnet 475, with the initial movement of the lever 434, the nose of the pawl 216 is not, however, immediately effective to check the spring-urged movement of the pin carriage 201 since the spacing between the teeth 220 is sufficient to permit a further partial ordinal movement of the carriage before the adjacent tooth engages the nose of the pawl. This partial movement of the carriage serves to impart a further translation to the lever 434, thereby closing contacts 492 of the switch 446 to effect energization of a solenoid 493. Solenoid 493 is mounted on a bracket 494, shown in phantom line in Fig. 9, which bracket is secured to the machine frame as at 495. In the embodiment shown, the solenoid 493 is mounted on the machine in operative relation to the multiplication control key 252, however, it becomes readily apparent that it may serve equally as well with respect to the control of any one of the control keys 250 or 251. With the closure of the contacts 492, therefore, energization of the solenoid 493 moves the plunger 496 downwardly to depress the control key 252 to initiate a multiplication operation in the well-known manner described hereinbefore.

It will be recalled that upon depression of the key 252 the product register is first shifted to its leftmost position and zeroized, in which end position the multiplying mechanism becomes operative to restore each actively positioned multiplier rack 203 to its "0" position. Upon restoration to "0," each active rack serves to effect an ordinal right shift of the product register and a one step shift of the pin carriage to the right to bring the multiplier rack 203 of the next higher order into active position. The shifting movement of the pin carriage during a multiplying operation is utilized to bring into play means for restoring an actively set pin 455 to inactive position after it has served its purpose of differentially terminating the leftward movement of the pin carriage. The restoring means comprises a conventional restoring finger 500 (Figs. 12 and 17) which is aligned with the slots 459 in the pins so as to enter the slots when the pin carriage is in its inactive right-hand position. Finger 500 is provided with a reduced end 501 from which cam surface 502 extends to the full width of the head of the finger, which width is substantially equal to the length of the slots 459. The width of end 501 is reduced to enable setting of a pin aligned therewith, as seen in Fig. 17. It will be seen that shifting movement of the multiplier pin carriage to the right will serve to move the pin upwardly from its active to its inactive position.

Restoring finger 500 is secured to a bracket 503 mounted on frame plate 261 and is so related to the position of the pin carriage 201 that it becomes active to restore a projected pin 455 to its inactive position on the second step of movement of the pin carriage immediately after the rack 203 corresponding ordinally to such pin has controlled an ordinal multiplying operation. As described in the aforementioned Patent Nos. 2,371,752 and 2,399,917, the last step of a multiplying operation involves an idle shifting of the pin carriage to restore the set stop pin 202 associated with the highest order rack 203. Similarly, this idle shifting movement of the pin carriage is utilized to restore the pin 455 radially aligned with the highest order rack 203 when such pin has been projected to its active position. Thus, it can be seen that when the highest, or leftmost order, rack 203 is returned to "0," the shift control is again operated to produce an idle shifting movement of the pin carriage to restore the pin 202 (Fig. 7) of the last row, to return the leftmost pin 455 (Fig. 12), when projected, to its inactive position, and to rock the bellcrank 210 (Fig. 10) to disable latch arms 257, 258 and therefore release the depressed key 252.

Figure 14:
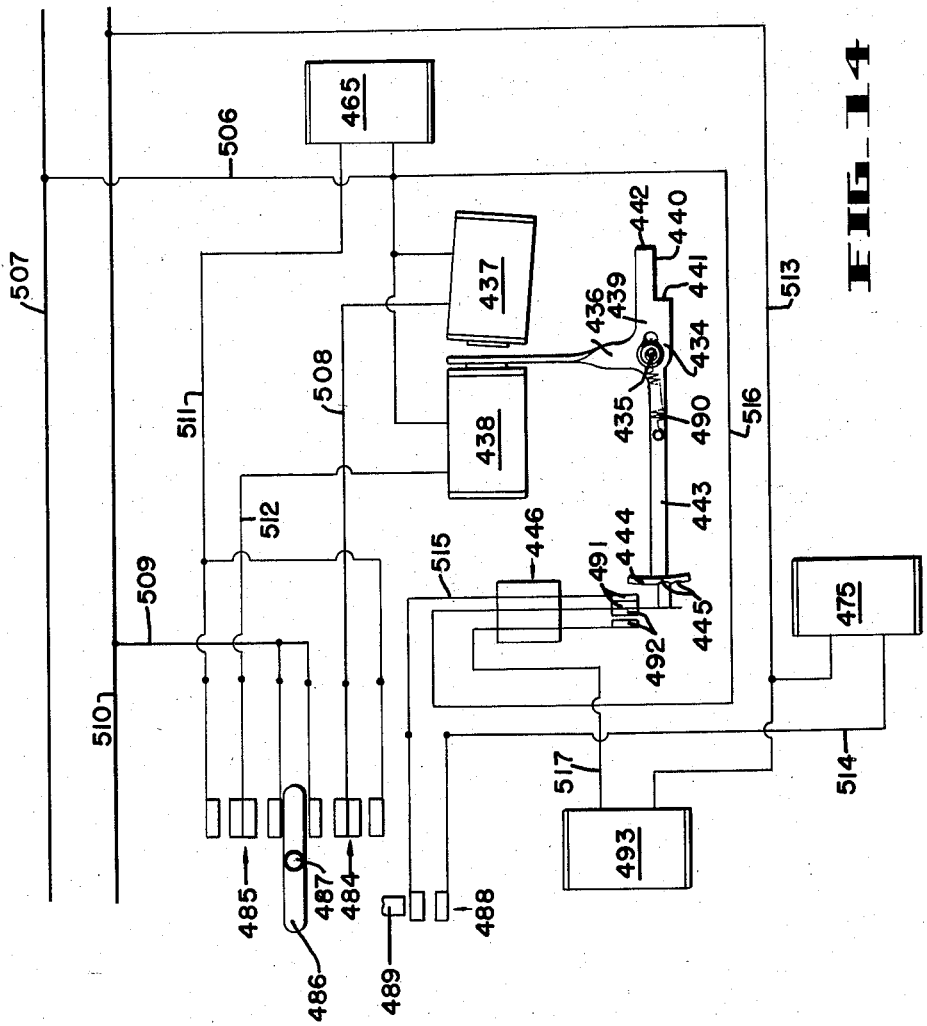
Fig. 14 is a wiring diagram of the decimal control electrical system.

Referring now to the wiring diagram shown in Fig. 14, the electrical system comprises the electromagnet 437 for the control of a two-place decimal which is connected by a line 506 to one side 507 of the power supply and is connected by a line 508 to the center pole of the switch 484. One outside pole of the switch 484 is connected by a line 509 to the other side 510 of the power supply. The other outside pole of the switch 484 is connected by a line 511 to the pin setting electromagnet 465 which is connected by the line 506 to one side 507 of the power supply. Accordingly, with a clockwise rocking of lever 486, the switch 484 is closed to complete the circuit from one side 510 of the power supply to energize electromagnet 437, thereby rocking lever 434 clockwise to align the shoulder 442 with an actively projected pin 455 limiting the subsequent movement of the pin carriage to two ordinal positions. Simultaneously, closure of the switch 484 completes the circuit from the power supply to the pin setting electromagnet 465 which is immediately operative to set a pin 455 in a selected escaped position of the pin carriage 201. Likewise, the four-decimal place electromagnet 438 is connected by line 506 to one side 507 of the power supply and is also connected by a line 512 to the center pole of the switch 485, one outside pole of which is connected by line 509 to the other side 510 of the power supply. The other outside pole of the switch 485 is connected by line 511 to the pin setting electromagnet 465 which is also connected by line 506 to the one side 507 of the power supply. Thus, it becomes readily apparent that a counter-clockwise rocking of lever 486 serves to close the switch 485 and thereby complete the circuit for the energization of the electromagnets 438 and 465 when the lever 434 is rocked to the detented four-decimal place position shown to align the shoulder 441 with the pin 455 which has been projected by the operation of the pin setting arm 464. The switch lever 486 may be immediately returned to, and retained in its neutral position shown by any suitable centralizing means.

To control the disabling of the escapement mechanism for an unrestrained movement of the pin carriage 201, the electromagnet 475 is caused to be energized. One line 513 connects the electromagnet 475 to one side 510 of the power supply, while the other line 514 is connected to one side of a switch 488, the other side of which is connected by a line 515 through a set of normally closed contacts 491 with a line 516 to the other side 507 of the power supply. Immediately following the release of the pin carriage 201 upon energization of the electromagnet 475, a selectively set pin 455 engages the shoulder 441 or 442 in accodance with the setting of the lever 434 to translate the lever 434 to the left, as viewed in Fig. 14, thereby opening contacts 491 and causing de-energization of the electromagnet 475. Translation of the lever 434 to the left operates substantially simultaneously with the opening of contacts 491 to close the contacts 492 for the enerization of the multiplication control solenoid 493. The circuit for the solenoid 493 includes one line 513 connected to one side 510 of the power supply and a line 517 connected, upon closure of the normally opened contacts 492, with the line 516 to the other side 507 of the power supply.

In operation, when four decimal places are desired in each product to be registered in the accumulator, either singly under the control of the solenoidally operated key 252 or for accumulation therein under the solenoidal control of the key 250 in lieu of key 252, the operator first determines the decimal places in the factors to be multiplied. If the greatest number of decimal places in any one of the multiplicands is two, the decimal position is established in the keyboard between the selected rows of keys 26 and each multiplicand, either in integer or decimalized, is placed in the keyboard relative to the established decimal position. The greatest number of decimal places in any one multiplier factor is also two, however, some have one decimal and some are whole numbers. Therefore, to invariably register a resulting product in the desired decimal position in the accumulator, there must be two decimal places in each multiplier factor entered into the multiplier pin carriage.

It will be recalled that each multiplier sector, or rack, 203, in its "0" or latched position, becomes immediately operative in the active position thereof to effect an ordinal right shift of the accumulator and the pin carriage, when the next higher order rack 203 is moved into active position. Consequently, if one of the multiplier factors is a whole number, the accumulator must be immediately shifted two ordinal positions to the right from its left end position before the multiplying operation is begun. In this shifted position of the accumulator, the register is in proper relation to the pre-established decimal point in the keyboard so that the resulting product is registered around the desired decimal position therein. Therefore, when the multiplier consists of a whole number, each digit is entered into the multiplier pin carriage 201 by a depression of the keys 200, and is followed by a clockwise rocking of the lever 486 to set the pin 455 in the escaped position of the pin carriage and to rock the lever 434 to align the shoulder 442 with the projected pin 455 to terminate the movement of the pin carriage 201 upon initiation of a multiplication operation. A depression of the control key 489 (Fig. 14) closes the switch 488 to release the pin carriage for engagement of the set pin 455 with the shoulder 442, thus effecting the entry of two zeros into the multiplier control mechanism. With the engagement of the pin with the shoulder the lever 434 is moved laterally sufficiently to de-energize the electromagnet 475 and to energize the solenoid 493 controlling the conventional multiplication control key 252.

The lowest order rack 203 representing a "0" immediately operates following a shift of the accumulator to its left end position to cause a right shift of the accumulator and the pin carriage when the next higher order rack representing a "0" is moved into active position where it becomes effective to again cause a second operation of the accumulator and pin carriage right shift mechanisms. In this position of the accumulator the next higher order rack, that is, the units value of the multiplier, becomes operative to effect the registration of the product in the desired decimal position of the accumulator. When the multiplier factor is decimalized to two places, the whole number digits are successively entered into the pin carriage and, upon the occurrence of the decimal point, the lever 486 (Fig. 14) is rocked clockwise to close the switch 484, thereby effecting a setting of the pin 455 corresponding to the next rack 203 to be escaped to an active position with the depression of a key 200 representative of the tenths digit of the decimal portion of the factor. Simultaneously, the shoulder 442 is rocked into active alignment with the set pin for engagement thereby. The hundredths digit of the decimal portion of the factor is then entered into the next lower order rack 203 when the escapement mechanism operates to escape the pin carriage a second ordinal position to engage the set pin with the shoulder 442. With this engagement, the lever 434 is moved against the urgency of spring 490 to close the switch contacts 492, thereby causing energization of the solenoid 493 to depress the control key 252 and initiate a multiplication operation in a well-known manner.

When it is desired to invariably register a series of products having six decimal places in a predetermined decimal position in the accumulator and the greatest number of decimal places in any one multiplicand is two, the multiplier pin carriage must be moved four ordinal spaces to the left, as viewed in Fig. 12, subsequent to a counter-clockwise rocking movement of the lever 486. The operation is similar to that described above, except that the counter-clockwise rocking of lever 486, upon the occurrence of the decimal point in the multiplier factor, causes energization of the electromagnet 438 to rock lever 434 to the position shown in Fig. 14. The electromagnet 465 is likewise similarly effectively energized to set a pin 455 for subsequent engagement with the shoulder 441 when the pin carriage has been moved four ordinal positions following the closure of the switch 485, such movement being made possible by the escapement mechanism under the control of the keys 200, or by a depression of key 489 when the energization of the electromagnet 475 is effective to disable the escapement mechanism.

In the operation of the decimal insertion mechanism described supra, one or more zeros may be automatically entered into the multiplier pin carriage 201 as determined by the selective closure of the switch 484 or 485 and the closing of the switch 488. Following the entry of the multiplier factor, the movement of the pin carriage 201 is effective to initiate a multiplication operation. As described above, upon the initiation of the multiplication operation, the accumulator is immediately shifted to its left end position, after which the multiplying operation proper is begun under the control of the multiplier pin carriage.

Referring to the wiring diagram (Fig. 14), it becomes readily apparent that the switch 488 may be so located in the electrical system as to require a closure thereof to initiate a multiplication under any circumstance. As shown, when the multiplier factor is a whole number or has less than two decimal places therein with the lever 434 in its clockwise rocked position, or less than four places with the lever in the position shown, a closure of switch 488 is required. However, if the factor has two digits or four digits in the decimal portion thereof in accordance with the respective position of the lever 434, the multiplication operation is immediately initiated upon entry of the last digit into the multiplier pin carriage. If, for any reason, a delay in the initiation of the multiplication operation is required or desired, a switch 488–a is positioned in the line 516, 516–a (Fig. 18) and thence through line 506 to one side 507 of the power supply. Closing of the switch 488–a would then be effective to complete the circuit through normally closed contacts 491 and an unbroken line 514–a to one side of electromagnet 475, the other side of which is connected by line 513 to the other side 510 of the power supply. Upon the engagement of the set pin 455 with either shoulder 441 or 442 and with switch 488–a held closed, contacts 491 are opened to de-energize electromagnet 475 and contacts 492 are closed to complete the circuit from one side 507 of the power supply through line 506, line 516, switch 488–a, line 516–a, and line 517 to one side of the multiplication control solenoid 493, the other side of which is connected by line 513 to the other side 510 of the power supply. Thus, it can be seen, that a closure of switch 488–a would invariably be required to initiate a multiplication operation per se.

We claim:

1. In a calculating machine having an ordinally shiftable product register, a selection means ordinally arranged to receive a multiplicand, means for shifting said register relative to said selection means, a multiplying mechanism for controlling the registration of a multiplicand in each shifted position of said register including a normally inoperatively positioned multiplier carriage having a plurality of ordinal elements adjustable to represent the digits of a multiplier factor, a valve entering means for adjusting said elements, means for shifting said carriage to an operative position, means for returning said carriage ordinally from an operative to an inoperative position, escapement means for the ordinal control of said carriage shifting means rendered operable by said value entering means with the entry of each digit of a multiplier factor including a zero, means for restoring each of said elements to "0" in each shifted position of said carriage thereby effecting the operation of said register shifting means and said returning means upon operation of said multiplying mechanism, and means for tabulating said register to a predetermined position with respect to said multiplicand selection means upon initiation of a multiplication operation, the combination comprising, a solenoidal control means for initiating operation of said multiplying mechanism, electrically controlled means for disabling said escapement means to enable unrestrained operation of said carriage shifting means, a stop member differentially adjustable to a plurality of positions for terminating the operation of said carriage shifting means, a detent means for said stop member operable in each adjusted position thereof, a plurality of electromagnets each of which is operable to differentially adjust said stop member in accordance with the electromagnet energized, a plurality of switches selectively operable to control the energization of a selected one of said electromagnets, a rack on said carriage for shifting movement therewith, a plurality of settable pins ordinally spaced in said rack in correspondence to the orders in said carriage, an electromechanical means controlled by each of said switches and operable to selectively set one of said pins in a selected ordinal position of said carriage, said pin being operable to engage said stop member thereby terminating the operation of said carriage shifting means, a multiplication control switch for causing energization of said electrically controlled disabling means, a switch means operable by said stop member upon engagement by a selected one of said pins to de-energize said disabling means and to energize said solenoidal control means, and means rendered operable by said returning means to reset said pins to an inoperative position upon operation of said solenoidal control means.

2. In a calculating machine having an ordinally shiftable product register, an ordinal selection means operable to receive a multiplicand, differential actuating means for effecting product registrations in said register, means for shifting said register ordinally relative to said multiplicand selection means, a multiplying mechanism for controlling a partial product in said register in each shifted position thereof, said mechanism including a normally inoperatively positioned multiplier carriage having ordinal means differentially settable to represent a multiplier factor, a multiplier indexing mechanism for differentially setting said settable means in ordinal sequence, means for shifting said carriage to an operative position and an escapement mechanism for effecting ordinal control of said shifting means with the setting of said differentially settable means, means for restoring said carriage ordinally to its inoperative position, means controlled by said differentially settable means in ach ordinal position of said carriage to effect multicyclic operation of said actuating means and to enable the ordinal operation of said restoring means and said register shifting means, and an automatic positioning control mechanism for said product register for predetermining an invariable number of places in the decimal fraction of each of a plurality of products registered for accumulation in said register, the combination comprising a stop arm settable to a plurality of differential positions to limit the shifting movement of said carriage, a detent means for retaining said stop arm in each differentially set position, control means selectively operable to set said stop arm, a plurality of pins corresponding ordinally to said differentially settable means movable with said carriage and selectively settable to engage said stop arm in a differentially set position thereof, an electromagnet rendered operable by said control means to set one of said pins representative of a decimal in a multiplier factor, a control switch, an electromagnetic means for control of said escapement mechanism to release said multiplier carriage for movement to a position determined by the engagement of a set one of said pins with said stop arm, a two position switch normally operable upon operation of said control switch to energize said electromagnetic means and movable from its normal position by said stop arm when engaged by said set one of said pins, a solenoid for initiating operation of said multiplying mechanism rendered operable by said two position switch in the moved position thereof, and means operable by said restoring means to restore said set one of said pins in the inoperative position of said carriage.

3. In a calculating machine having a shiftable product register, differential actuating means therefor, means for ordinally shifting said register, a multiplier factor storage device including a carriage, selection elements ordinally arranged in said carriage normally in a zero indicating position, a value entering means for adjusting said elements to multiplier digit representing positions, means controlled by each successive one of said selection elements, in an operative position thereof, to effect multicyclic operation of the actuating means and operation of the register shifting means in sequence during a multiplying operation, means for shifting said carriage ordinally to an operative position relative to said selection element controlled means, and an escapement mechanism operable to control said carriage shifting means for one ordinal shift of said carriage with each digital entry by said value entering means including a zero, a decimal insertion mechanism for said storage device comprising electromagnetic means for disabling said escapement mechanism and enabling operation of said carriage shifting means to move said carriage toward an end position, a plurality of elements in said carriage selectively settable to represent a decimal in a multiplier factor, means differentially positionable for engagement by a selected one of said settable elements to limit the subsequent ordinal movement of said carriage in accordance with the differential positioning of the positionable means, a decimal control means manually operable to control the differential positioning of said positionable means and the selective setting of said settable elements, and manually controlled means selectively operable to cause energization of said electromagnetic means to enable shifting of said carriage to a position determined by the engagement of a selected one of said settable elements with said differentially positioned positionable means.

4. In a calculating machine, an ordinally arranged selection means settable to represent a multiplicand, a product register ordinally shiftable relative to said multiplicand selection means, a differential actuating means for controlling the registration of a partial product in said register in each ordinally shifted position thereof, means for shifting said product register, a multiplier mechanism including means for controlling multicyclic operation of said actuating means and the operation of said shifting means in sequence, ordinal means differentially settable to represent the digits of a multiplier factor and successively operable to control the operation of said operation controlling means, means rendered operative by said operation controlling means to effect operation of a succeeding ordinal differentially settable means, multiplier factor entering means for ordinally setting said settable means, control means operable to initiate operation of said multiplier mechanism, selective means for determining an invariable decimal position of products registered in said register during a series of multiplication operations including means associated with said multiplier mechanism and selectively adjustable during operation of said multiplier factor entering means to represent the decimal point in a multiplier factor, an electromechanical means operative to adjust said adjustable means, means differentially positionable in a selected one of a plurality of positions for engagement with said adjustable means to limit the ordinal setting of said settable means in accordance with the position of said positionable means subsequent to the operation of said adjustable means, electromagnetic means for positioning said positionable means, an electrical system rendered operable by said selective means to cause energization of said electromechanical means and said electromagnetic means, a source of power for said electrical system, and means controlled by said positionable means upon engagement by said adjustable means to effect control of said initiating control means.

5. In a calculating machine, an ordinally arranged selection means settable to represent a multiplicand, a product register ordinally shiftable relative to said multiplicand selection means, a differential actuating means for controlling the registration of a partial product in said register in each ordinally shifted position thereof, means for shifting said product register, a multiplier mechanism including ordinal differentially settable means, a multiplier factor entering means for setting said settable means to represent the digits of a multiplier factor, means successively controlled by the ordinal differentially settable means to control multicyclic operation of said actuating means and operation of said shifting means in sequence, means rendered operative by said successively controlled means to enable operation of a succeeding ordinal differentially settable means, control means operable to initiate operation of said multiplier mechanism, selective means for determining an invariable decimal position of products registered in said register during a series of multiplication operations including means differentially positionable in a selected one of a plurality of positions, electromagnetic means for positioning said positionable means, decimal representation means for said multiplier mechanism selectively adjustable for engagement with said positionable means during operation of said factor entering means to limit the number of operations of said multiplier factor entering means subsequent to the positioning of said positionable means and the operation of said representation means, an electromechanical means operative to adjust said decimal representation means, an electrical system operable by said selective means to cause energization of said electromagnetic means and said electromechanical means, a source of power for said electrical system, means controlled by said positionable means upon engagement by said decimal representation means to effect operation of said initiating means, a switch, and electrically operated means operable upon closure of said switch to effect engagement of said positionable means by said representation means whenever a multiplier factor has a lesser number of decimal places than that represented by the position of said positionable means.

6. In a calculating machine, an ordinally shiftable carriage, a plurality of ordinal elements in said carriage adjustable to represent a factor, a value selection means for adjusting said elements, means for shifting said carriage relative to said selection means, shift control means controlled by said value selection means for effecting ordinal operation of said shifting means, a decimal insertion mechanism including means positionable in a selected one of a plurality of positions for differentially limiting the subsequent ordinal shifting movement of said carriage during operation of said value selection means, a series of normally inactive members in said carriage, one for each of said ordinal elements, selectively settable for engagement with said positionable means to terminate operation of said shifting means, electromagnetic means for selectively positioning said positionable means and for setting one of said settable members in a selected ordinal position of said carriage, manually operable means for energizing said electromagnetic means during operation of said value selection means and upon the occurrence of a decimal in a factor, a switch, and means activated upon operation of said switch subsequent to the operation of said manually operable means to disable said shift control means and effect operation of said shifting means to move said carriage to a position determined by the engagement of a set one of said settable members with said positionable means in a selected position thereof.

7. In a calculating machine, an ordinally arranged selection mechanism, a product register shiftable ordinally relative to said selection mechanism, a differential actuating means for controlling the registration of a partial product in said register in each ordinally shifted position thereof, means for shifting said product register, a multiplier mechanism including ordinal differentially settable means and means successively controlled by the ordinal differentially settable means to control multicyclic operation of said actuating means and operation of said shifting means in sequence, one of the said latter two named means being ordinally shiftable in either direction relative to the other, factor entering means for ordinally setting said settable means in accordance with the digits of a multiplier factor, means rendered operable by said factor entering means to shift the shiftable one of said means in said multiplier mechanism in one direction, means enabled by said successively controlled means to shift the shiftable one of said means in said multiplier mechanism in the other direction, means for initiating operation of said multiplifier mechanism, selective means for determining an invariable decimal position of products registered in said register during a series of multiplication operations including an electromagnetic means and an electromechanical means, an electrical system rendered operable by said selective means to cause energization of said electromagnetic means and said electromechanical means, a source of power for said electrical system, a series of elements associated with the shiftable one of said means in said multiplier mechanism selectively adjustable by said electromagnetic means during operation of said factor entering means to represent the decimal point in a multiplier factor, means differentially positionable by said electromechanical means in a selected one of a plurality of positions for engagement by the selected one of said adjustable elements to limit the number of operations of said factor entering means subsequent to the operation of said selective means, and means controlled by said positionable means upon engagement by a selected one of said adjustable elements to effect operation of said initiating means.

References Cited in the file of this patent

UNITED STATES PATENTS

| 829,357 | Stroh | Aug. 21, 1906 |
| 1,018,510 | McCaskey | Feb. 27, 1912 |
| 1,145,599 | Landsiedel | July 6, 1915 |
| 1,707,303 | Greve | Apr. 2, 1929 |
| 1,911,515 | Koronski | May 30, 1933 |
| 2,042,909 | Satukangas | June 2, 1936 |
| 2,058,922 | Stickney | Oct. 27, 1936 |
| 2,061,362 | Lentz | Nov. 17, 1936 |
| 2,376,997 | Friden | May 29, 1945 |
| 2,467,419 | Avery | Apr. 19, 1949 |
| 2,645,422 | Pfleger | July 14, 1953 |
| 2,681,765 | Hopkins | June 22, 1954 |

UNITED STATES PATENT OFFICE
CERTIFICATE OF CORRECTION

Patent No. 2,868,454                                                         January 13, 1959

David F. Rutland et al.

It is hereby certified that error appears in the printed specification of the above numbered patent requiring correction and that the said Letters Patent should read as corrected below.

Column 1, line 37, for "carrier" read -- carriage --; column 3, line 43, for "Intermedite" read -- Intermediate --; column 4, line 12, for "opertaive" read -- operative --; column 6, line 11, for "199" read -- 99 --; column 11, line 18, for "bears" read -- gears --; column 15, line 41, for "prices" read -- price --; column 16, line 38, for "as", second occurrence, read -- at --; column 17, line 7, for "convenional" read -- conventional --; column 18, line 21, for "diclosed" read -- disclosed --; column 19, line 27, for "mouned" read -- mounted --; column 20, line 63, for "accodance" read -- accordance --; line 69, for "enerization" read -- energization --; column 23, line 3, for "valve" read -- value --; line 52, after "product" insert -- registration --; line 63, for "ach" read -- each --.

Signed and sealed this 28th day of July 1959.

(SEAL)
Attest:

KARL H. AXLINE  
Attesting Officer

ROBERT C. WATSON  
Commissioner of Patents